(12) United States Patent
Sakaguchi et al.

(10) Patent No.: US 8,708,818 B2
(45) Date of Patent: Apr. 29, 2014

(54) DISPLAY CONTROL SYSTEM, DISPLAY CONTROL METHOD, COMPUTER-READABLE STORAGE MEDIUM HAVING STORED THEREON DISPLAY CONTROL PROGRAM, AND DISPLAY CONTROL APPARATUS

(75) Inventors: Tsubasa Sakaguchi, Kyoto (JP); Hiroshi Umemiya, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/611,859

(22) Filed: Sep. 12, 2012

(65) Prior Publication Data
US 2013/0267310 A1    Oct. 10, 2013

(30) Foreign Application Priority Data
Apr. 4, 2012 (JP) ................................ 2012-085099

(51) Int. Cl.
*G06F 17/00* (2006.01)
(52) U.S. Cl.
USPC .......................................................... 463/31
(58) Field of Classification Search
USPC ................ 463/30–33, 37; 345/158, 419, 659
See application file for complete search history.

(56) References Cited

U.S. PATENT DOCUMENTS

| 8,360,880 B2* | 1/2013 | Abe ................................ 463/31 |
| 8,427,506 B2* | 4/2013 | Kato ............................. 345/632 |
| 2012/0040759 A1 | 2/2012 | Ito et al. | |
| 2012/0115595 A1* | 5/2012 | Ohta et al. ..................... 463/30 |
| 2012/0115602 A1* | 5/2012 | Musa et al. .................... 463/31 |
| 2012/0229448 A1* | 9/2012 | Matsunaga et al. ........... 345/419 |
| 2012/0229516 A1* | 9/2012 | Matsunaga et al. ........... 345/659 |
| 2012/0231881 A1* | 9/2012 | Matsunaga .................... 463/31 |
| 2013/0109473 A1* | 5/2013 | Yamashita et al. .............. 463/31 |

FOREIGN PATENT DOCUMENTS

| JP | 2007-310031 | 11/2007 |
| JP | 2012-50804 | 3/2012 |

* cited by examiner

*Primary Examiner* — Ronald Laneau
(74) *Attorney, Agent, or Firm* — Nixon & Vanderhye, P.C.

(57) ABSTRACT

An image of a virtual space viewed from a first virtual camera is displayed on a screen provided on an example terminal device, and an image of the virtual space viewed from a second virtual camera which operates in conjunction with the first virtual camera is displayed on a display device. A first user operates a user object while viewing the screen of the terminal device. A second user views the screen of the display device on which an image similar to that on the screen of the terminal device is being displayed, and indicates a position on the screen, using a controller. An indicated object is arranged at a position in the virtual space corresponding to the position indicated on the screen of the display device, and the indicated object is displayed on the screen of the terminal device.

22 Claims, 25 Drawing Sheets

FIG. 3
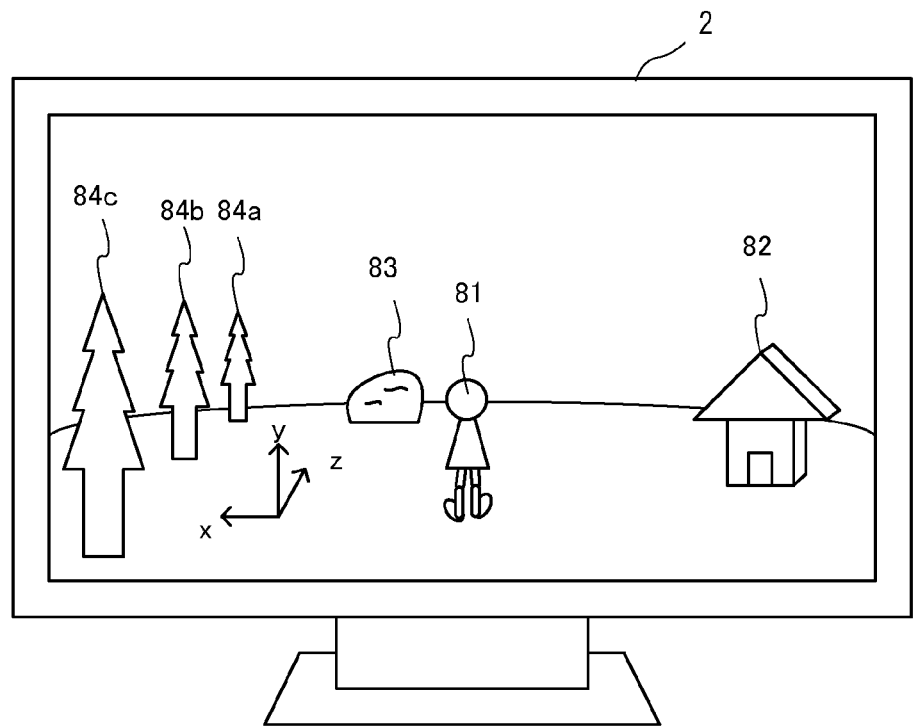
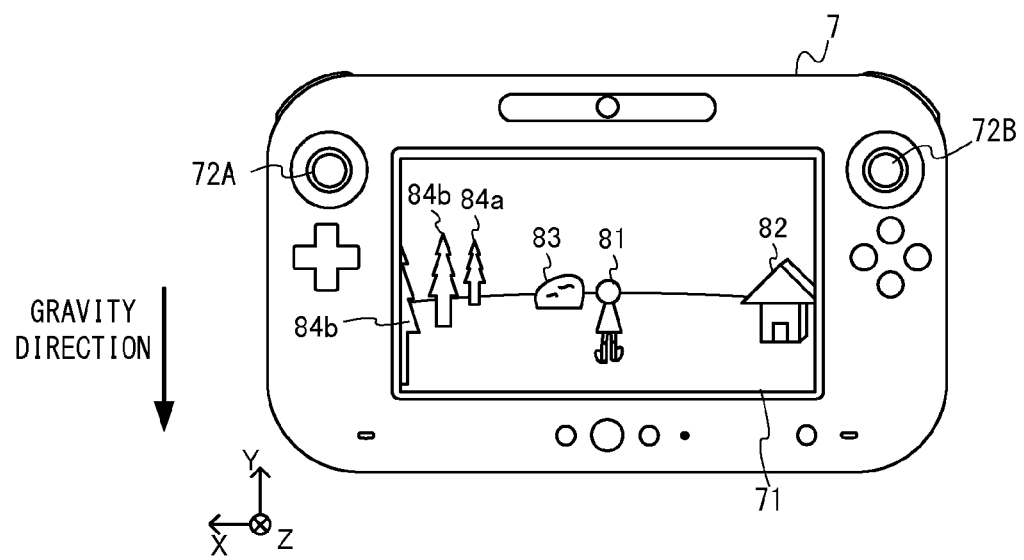

FIG. 6
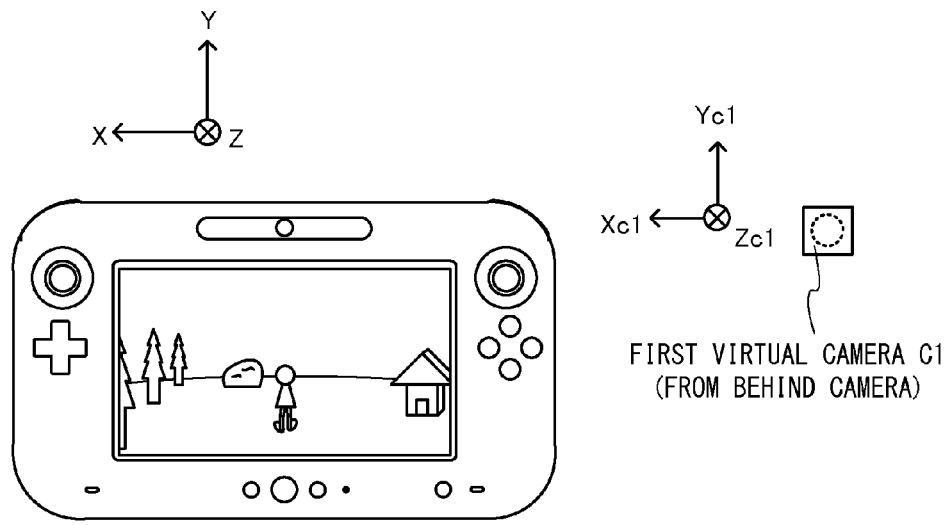
ROTATE OPERATION DEVICE ABOUT Z-AXIS
ROLL DIRECTION ROTATION
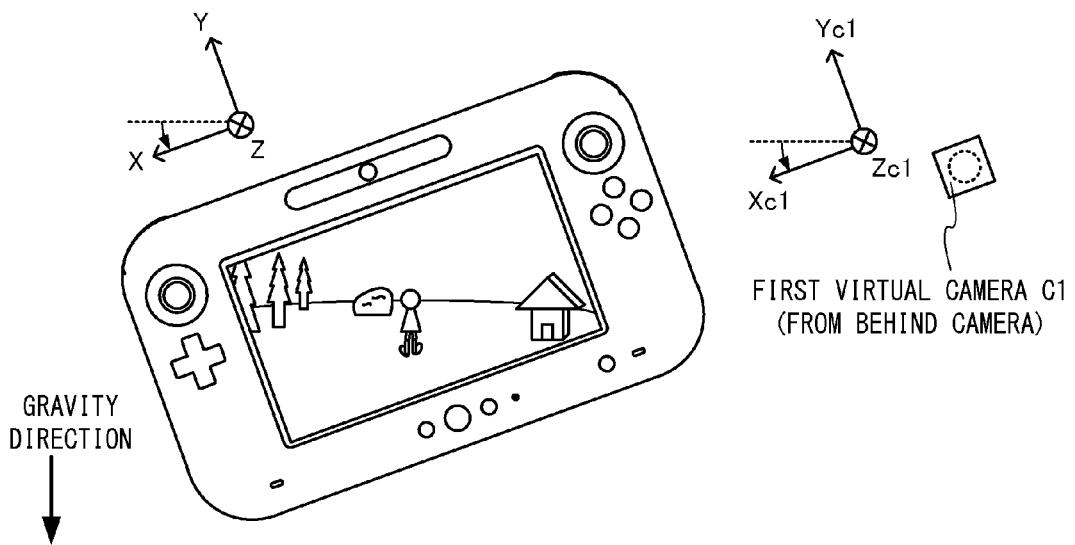

FIG. 10
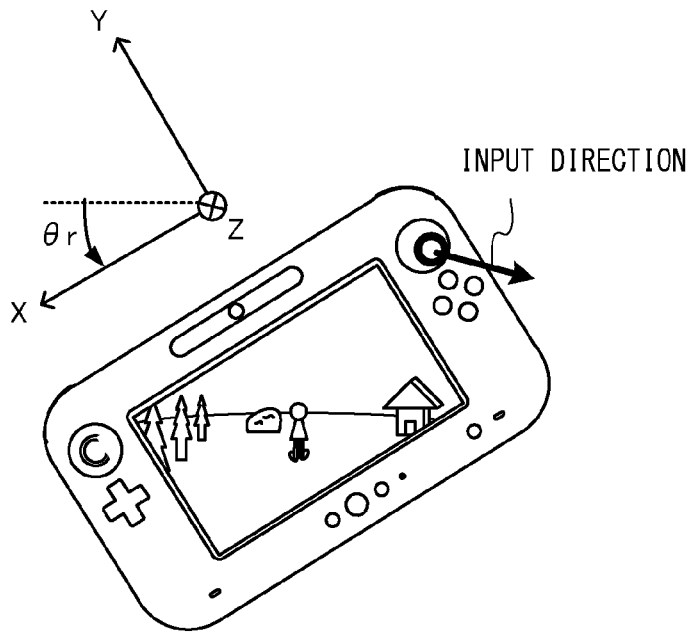
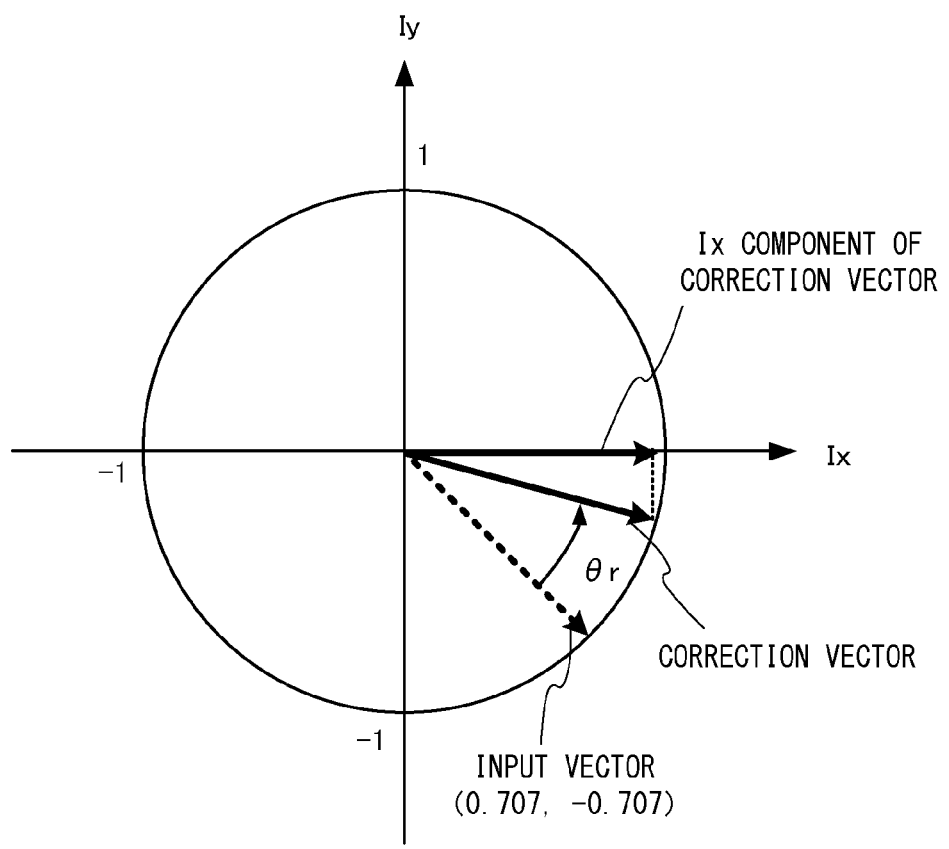

FIG. 11
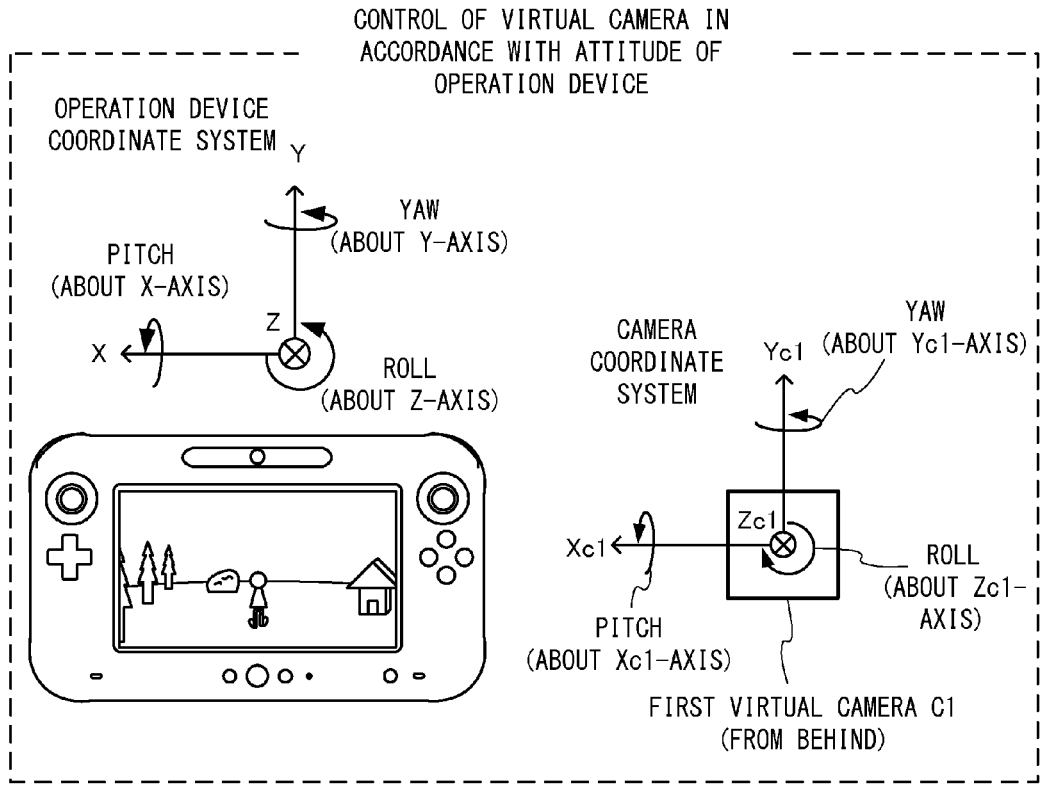
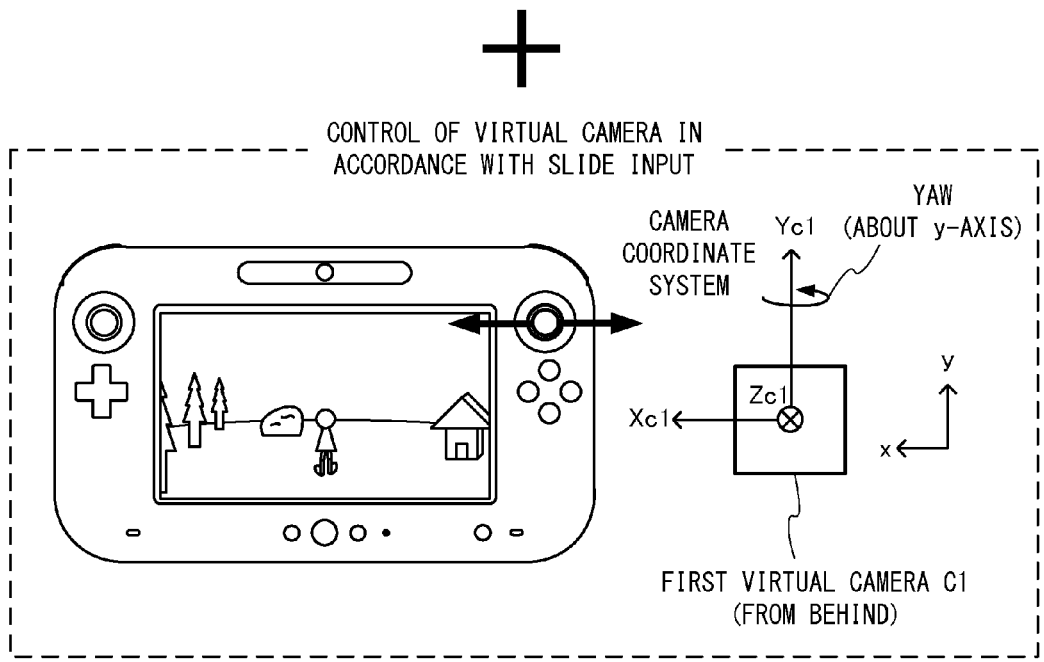

FIG. 12
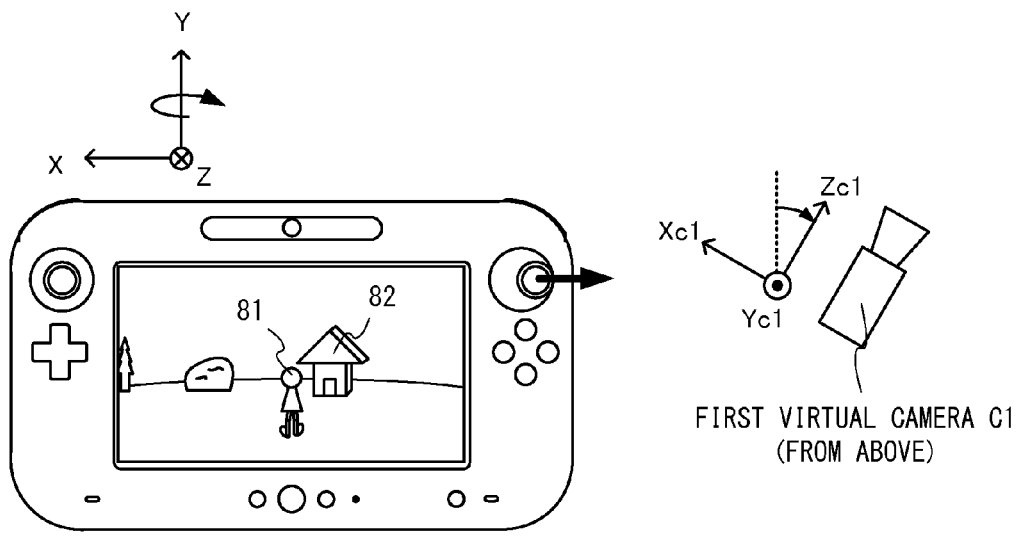
FIRST VIRTUAL CAMERA C1
(FROM ABOVE)
SECOND VIRTUAL CAMERA OPERATES IN
CONJUNCTION WITH FIRST VIRTUAL
CAMERA (YAW DIRECTION)
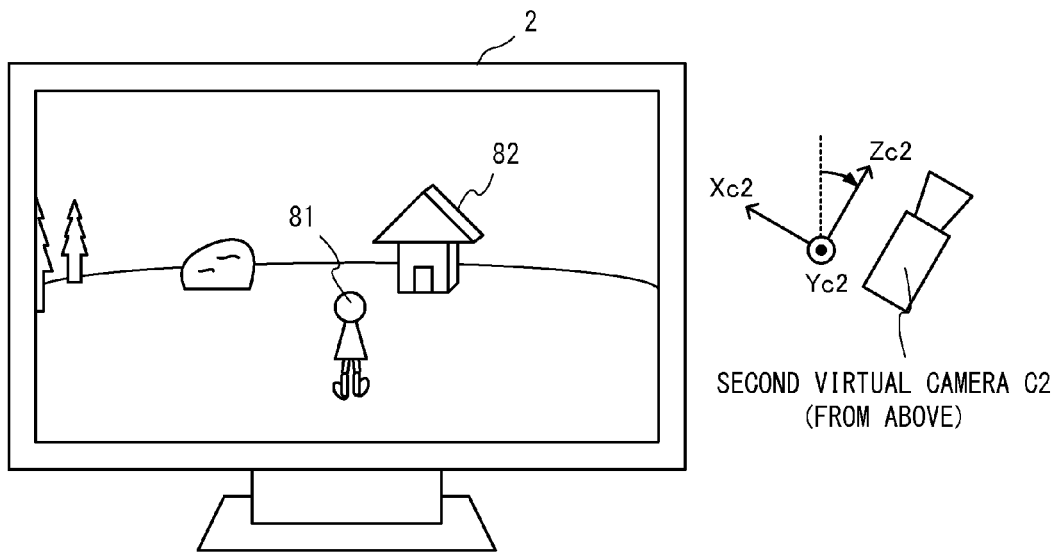
SECOND VIRTUAL CAMERA C2
(FROM ABOVE)

FIG. 13
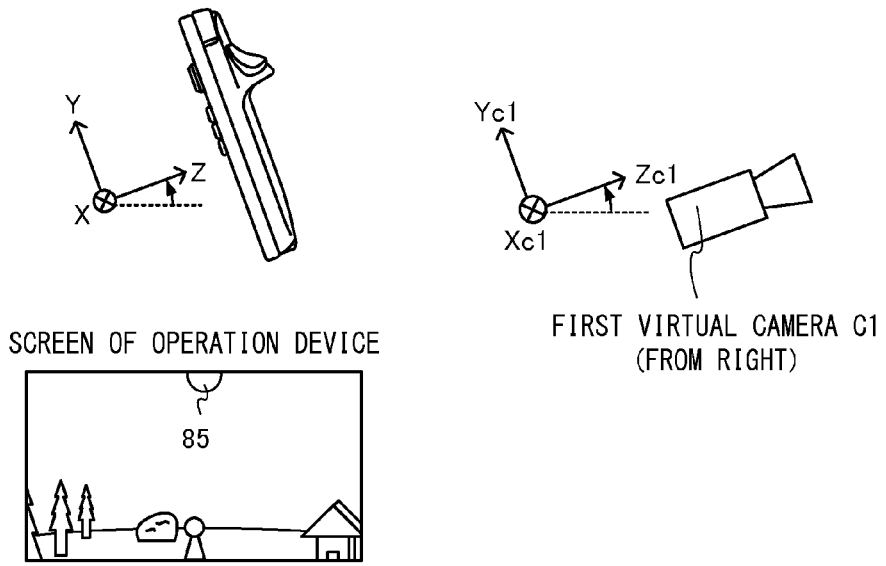
SCREEN OF OPERATION DEVICE
FIRST VIRTUAL CAMERA C1
(FROM RIGHT)
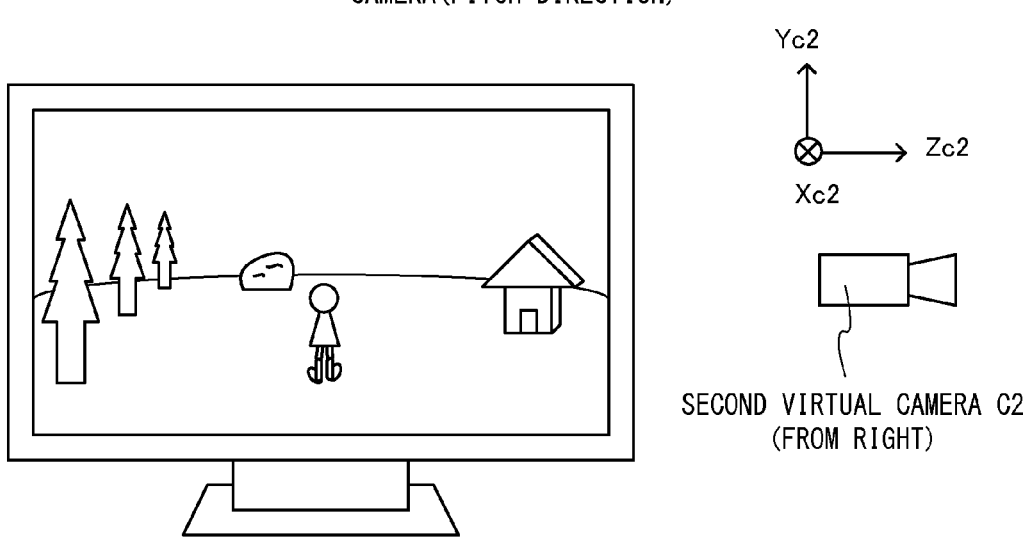
SECOND VIRTUAL CAMERA DOES NOT OPERATE IN
CONJUNCTION WITH FIRST VIRTUAL
CAMERA (PITCH DIRECTION)
SECOND VIRTUAL CAMERA C2
(FROM RIGHT)

FIG. 14
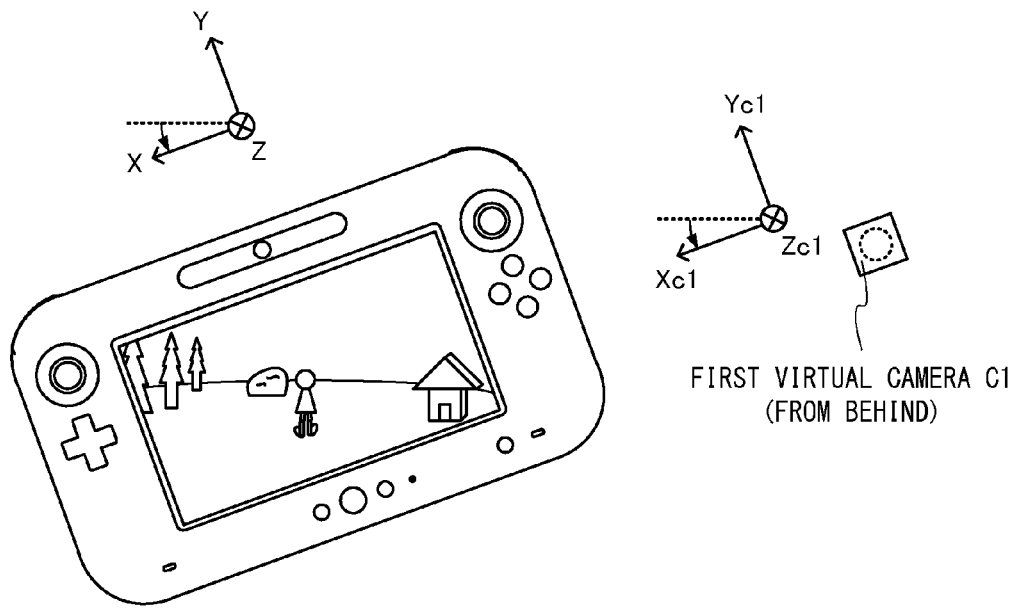
SECOND VIRTUAL CAMERA DOES NOT OPERATE
IN CONJUNCTION WITH FIRST VIRTUAL
CAMERA(ROLL DIRECTION)
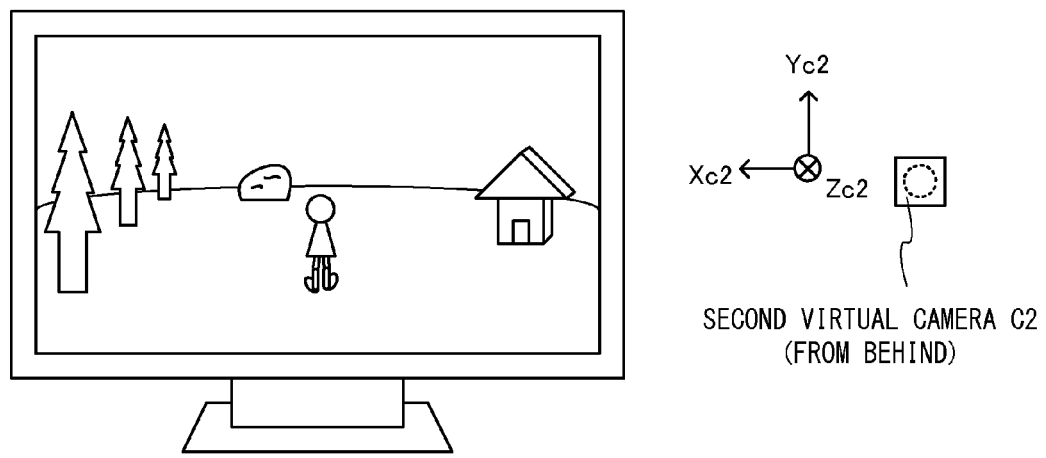

FIG. 17
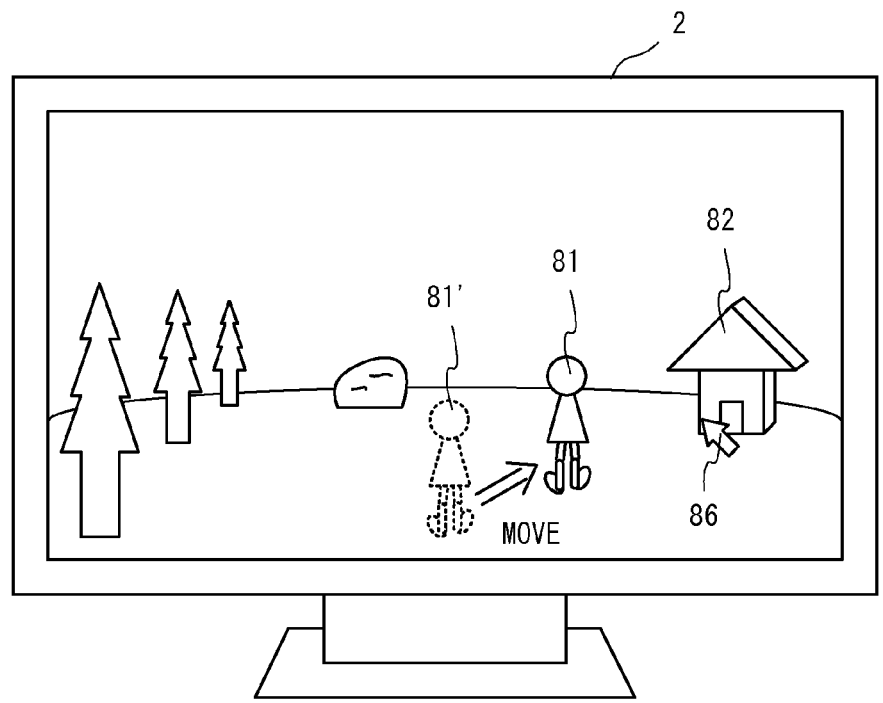
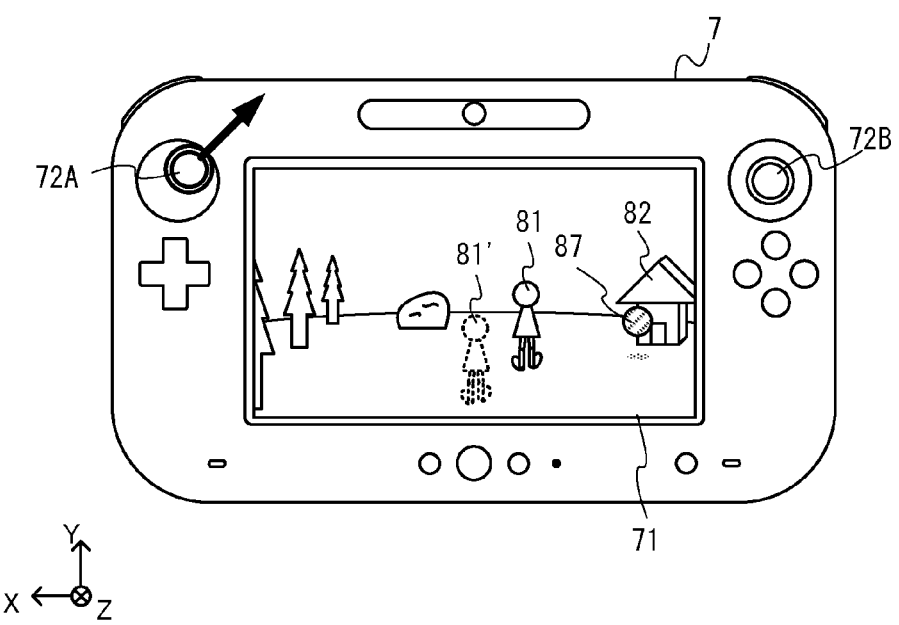

FIG. 18
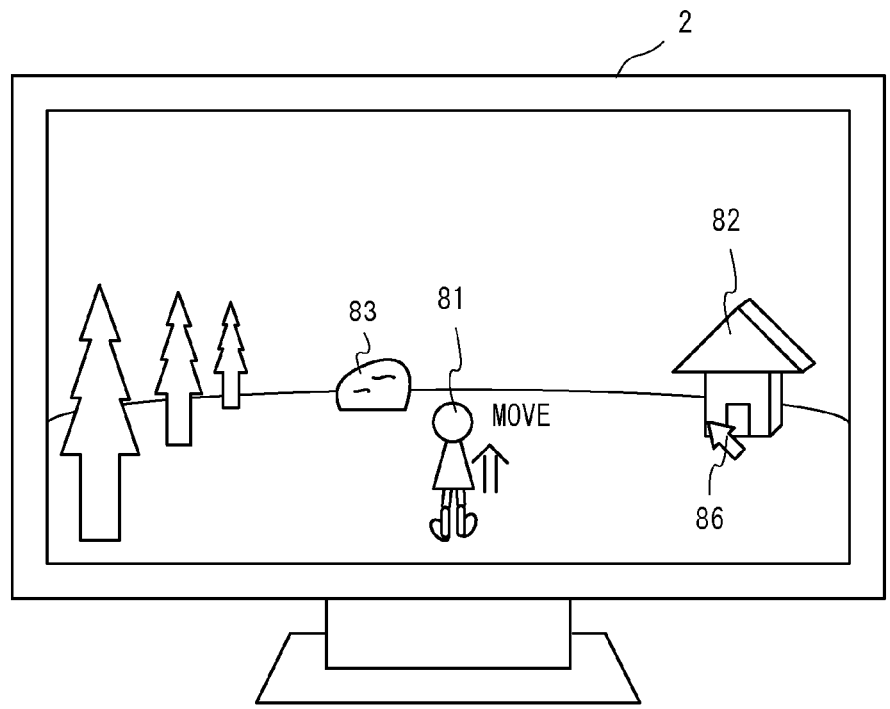
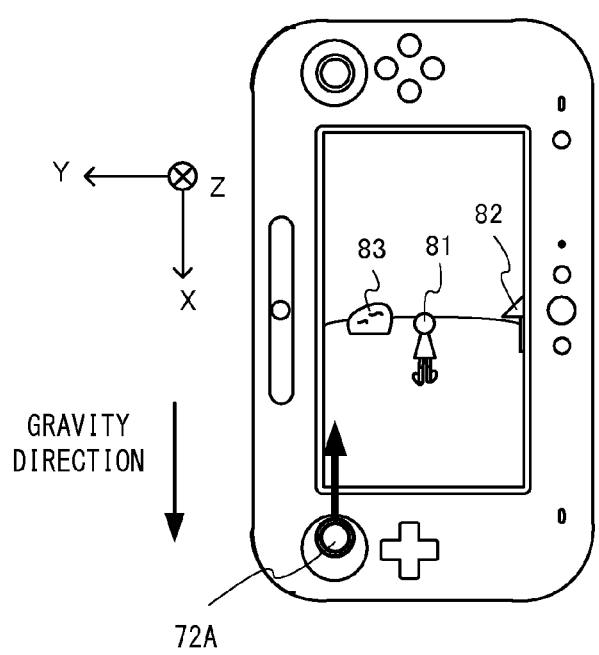

FIG. 19
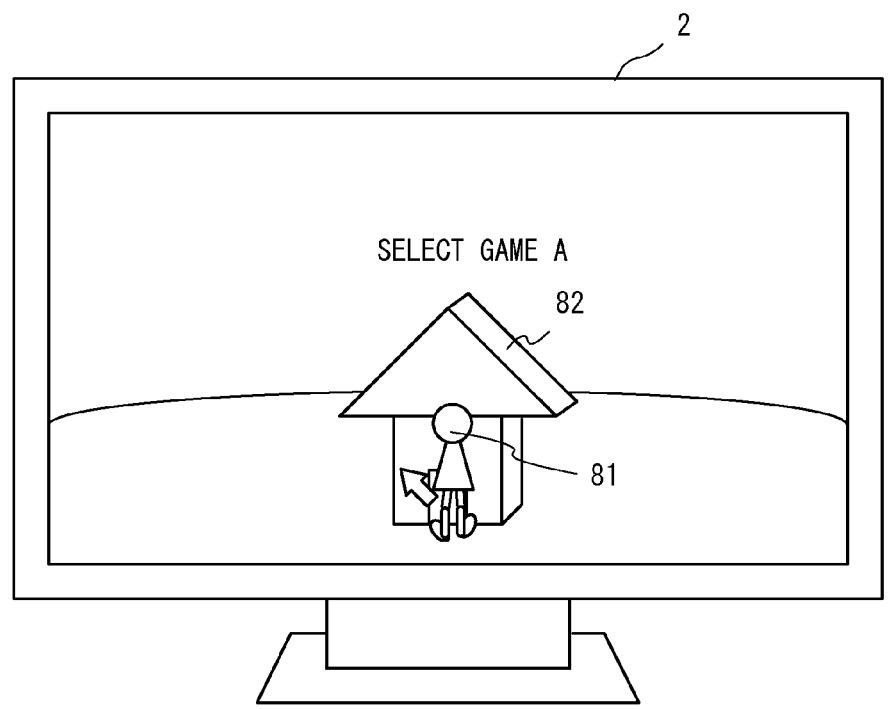
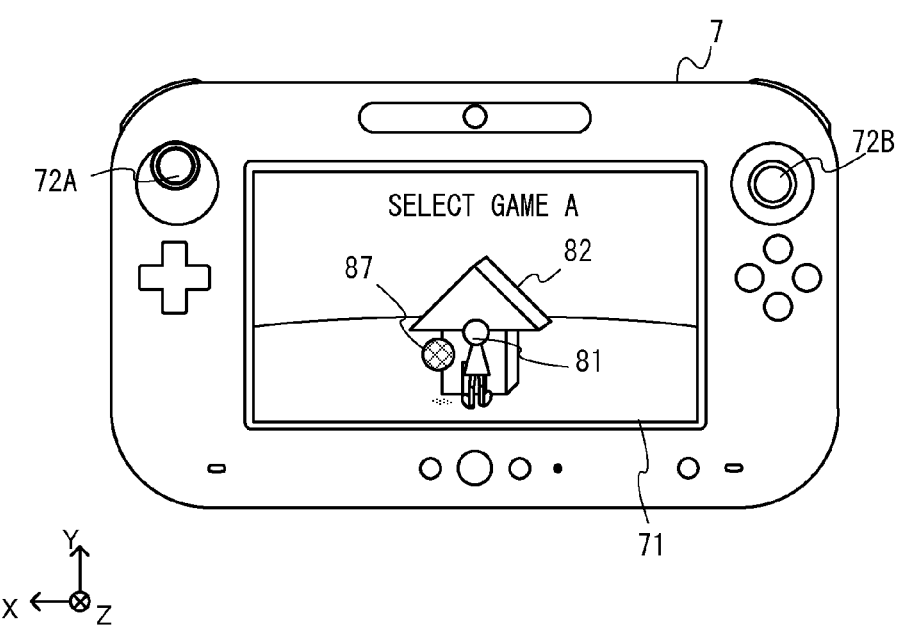

FIG. 20
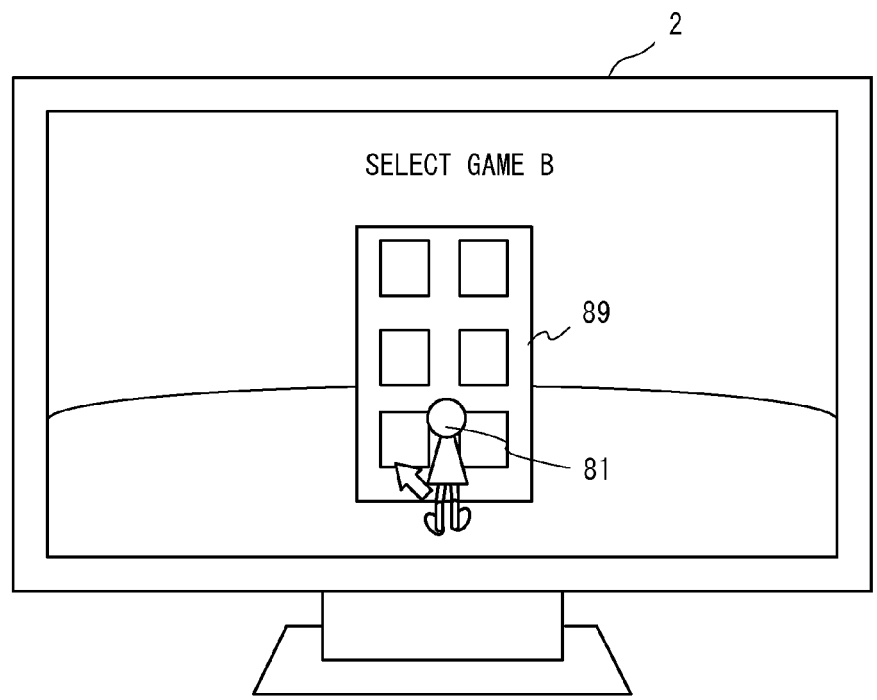
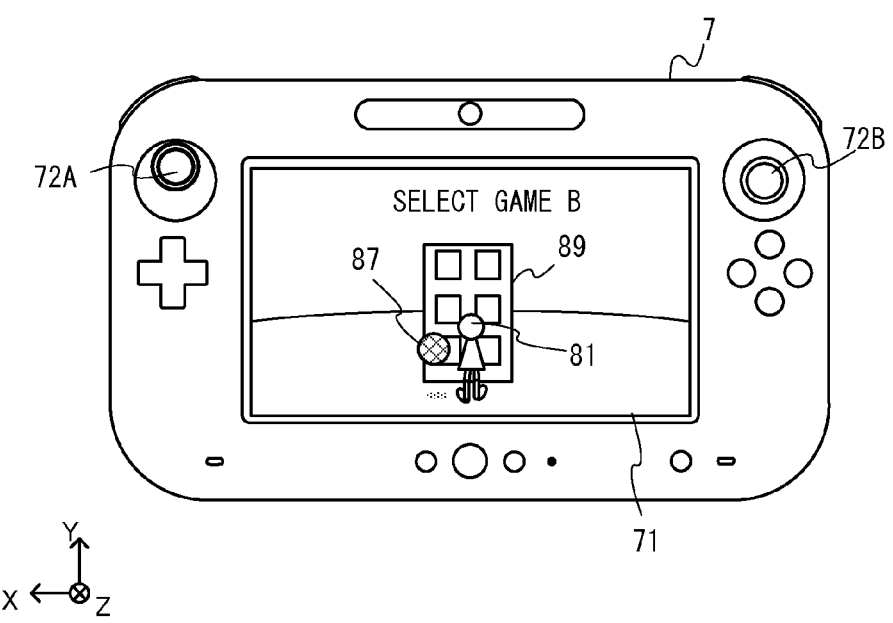

FIG. 22
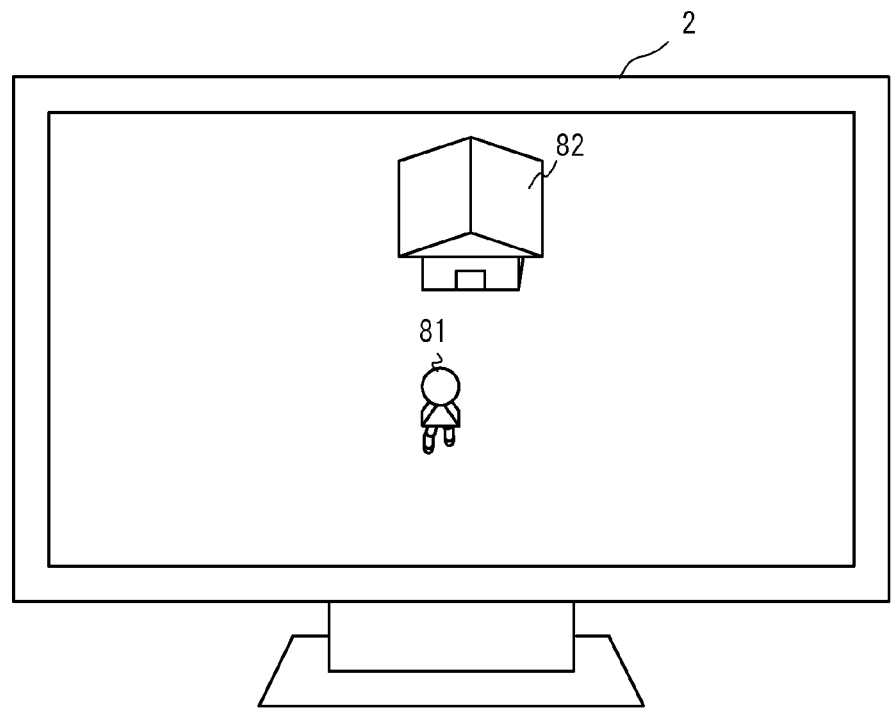
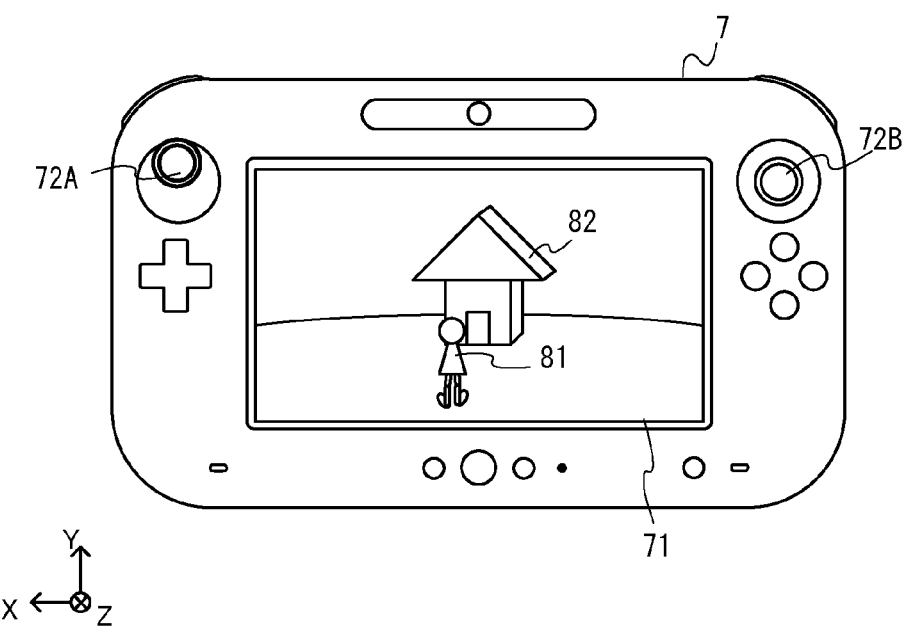

F I G. 2 3
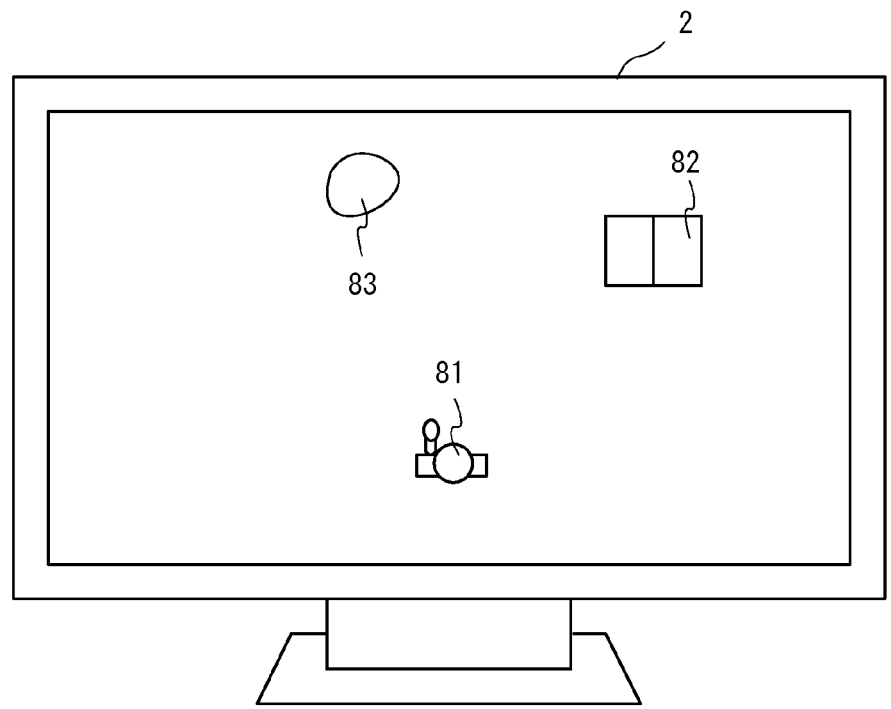
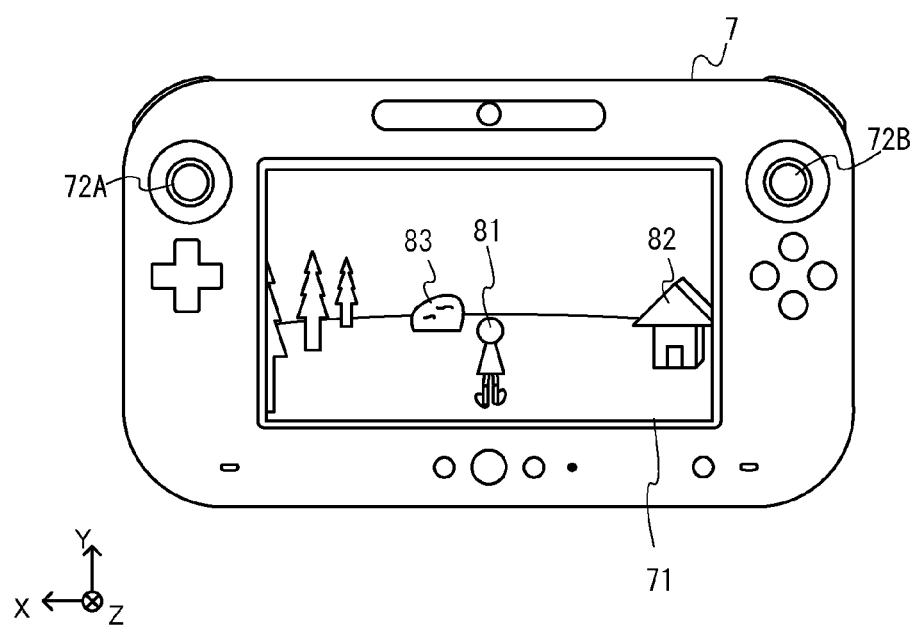

F I G. 2 4
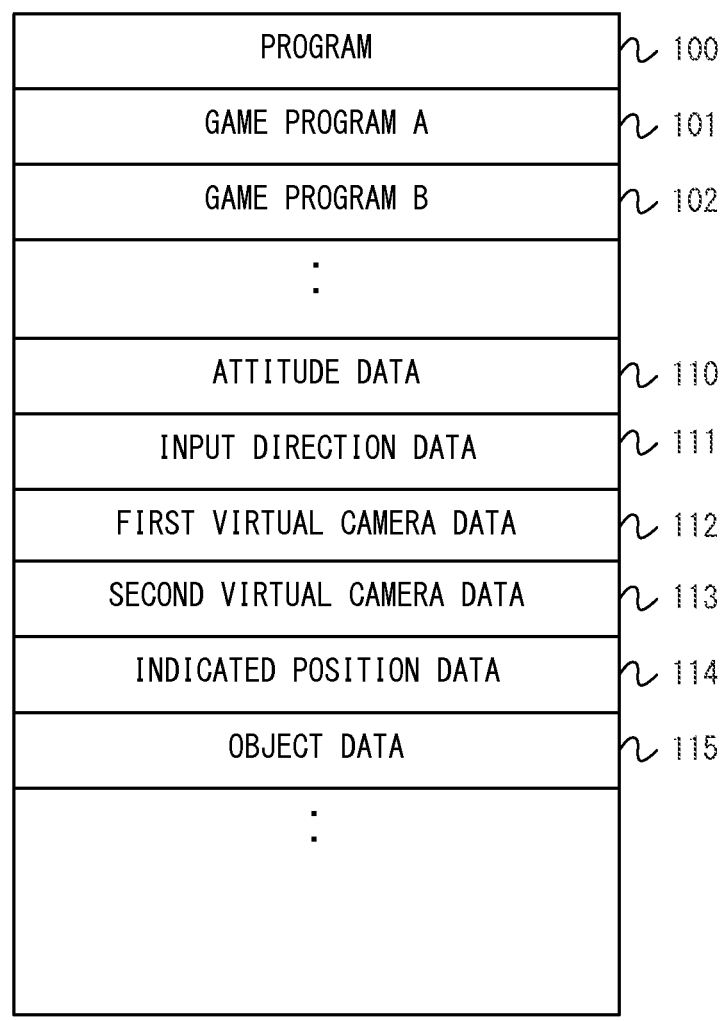

DISPLAY CONTROL SYSTEM, DISPLAY CONTROL METHOD, COMPUTER-READABLE STORAGE MEDIUM HAVING STORED THEREON DISPLAY CONTROL PROGRAM, AND DISPLAY CONTROL APPARATUS

CROSS REFERENCE TO RELATED APPLICATION

The disclosure of Japanese Patent Application No. 2012-085099, filed on Apr. 4, 2012, is incorporated herein by reference.

FIELD

The technology disclosed herein relates to a display control system, a display control method, a computer-readable storage medium having stored thereon a display control program, and display control apparatus, for causing a plurality of display sections to display images.

BACKGROUND AND SUMMARY

Conventionally, there exists a game system which allows a plurality of people to play a game and which causes two or more display devices to display game images. For example, there is a game system which allows a first player who operates an operation device and a second player who operates a device provided with a display section to play a game, and which causes the display section and a display device other than the display section to display game images.

However, in the above technology, game images are displayed on two screens, respectively, and the players play the game while looking at the images displayed on the screens, respectively. Therefore, there has been room to improve communication between the players.

Therefore, an object of one embodiment is to provide a technology that allows images to be displayed on a plurality of screen and allows users to communicate with each other.

One embodiment has adopted the following configurations in order to solve the above issue.

One embodiment is a display control system which causes a first display device and a second display device other than the first display device to display images. The display control system includes a virtual camera control section, a first display control section, a second display control section, an indicated position obtaining section, a position calculation section, and an object arrangement section. The virtual camera control section controls the first virtual camera based on an operation performed onto a first operation device. The first display control section causes the first display device to display an image of a virtual space viewed from the first virtual camera. The second display control section causes the second display device to display an image of the virtual space viewed from the first virtual camera or a second virtual camera which operates in conjunction with the first virtual camera. The indicated position obtaining section obtains a position on a screen of the second display device indicated by using a second operation device other than the first operation device. The position calculation section calculates a position in the virtual space corresponding to the position on the screen of the second display device obtained by the indicated position obtaining section. The object arrangement section arranges a predetermined object at the position in the virtual space calculated by the position calculation section. The first display control section causes the first display device to display an image including the predetermined object.

According to the above, it is possible to arrange a predetermined object at a position in the virtual space corresponding to the position on the screen of the second display device indicated by using the second operation device, to cause the first display device to display the object, and to allow communication between users.

Further, in another configuration, the first display device and the first operation device may be realized in one portable device.

According to the above, it is possible to display the predetermined object on the first display device provided in the portable display device.

Further, in another configuration, the first virtual camera may take an image including a user object arranged in the virtual space. The display control system further includes a user object control section and a processing section. The user object control section moves the user object in accordance with the operation performed onto the first operation device. The processing section performs, when the user object has selected a selection object arranged in the virtual space, a predetermined process corresponding to the selection object.

According to the above, it is possible to move the user object in accordance with the operation performed onto the first operation device, to select a selection object arranged in the virtual space by moving the user object, and to perform a predetermined process. Accordingly, for example, the second user operating the second operation device can indicate a selection object displayed on the screen of the second display device, to cause the predetermined object to be displayed, in the first display device, at the indicated position of the selection object. Thus, it is possible to allow the first user operating the first operation device to select the indicated selection object.

Further, in another configuration, the first display control section may further cause the first display device to display an indicator indicating a positional relationship between the predetermined object and the user object.

According to the above, the user can know the positional relationship between the predetermined object and the user object, by viewing the first display device.

Further, in another configuration, the processing section may execute a predetermined program corresponding to the selection object.

According to the above, it is possible to execute a predetermined program by selecting a selection object.

Further, in another configuration, the second display control section may cause the second display device to display an image of the virtual space viewed from the second virtual camera. The first virtual camera rotates with respect to a plurality of directions, in accordance with the operation performed onto the first operation device. The second virtual camera operates in conjunction with the first virtual camera with respect to a predetermined direction among the plurality of directions.

According to the above, it is possible to rotate the first virtual camera with respect to a plurality of directions, in accordance with an operation performed onto the first operation device, and to cause the second virtual camera to operate in conjunction with the first virtual camera with respect to a predetermined direction.

Further, in another configuration, the predetermined direction may be a yaw direction based on the virtual space.

According to the above, the second virtual camera operates in conjunction with the first virtual camera with respect to the yaw direction in the virtual space. Accordingly, it is possible to rotate the first virtual camera in a plurality of directions, and to direct the first virtual camera to various directions in the virtual space, whereas it is possible to direct the second virtual camera to a horizontal direction in the virtual space.

Further, in another configuration, the second display control section may cause the second display device to display an image of the virtual space viewed from the second virtual camera. Further, a range of the virtual space an image of which is taken by the second virtual camera is wider than a range of the virtual space an image of which is taken by the first virtual camera.

According to the above, it is possible to display, in the second display device, a range of the virtual space wider than that in the first display device.

Further, in another configuration, an orientation of the second virtual camera may be set such that a direction in the virtual space corresponding to a depth direction for the image displayed on the first display device coincides with a depth direction for the image displayed on the second display device.

According to the above, it is possible to display images of the virtual space viewed from substantially the same viewpoint, on the first display device and the second display device, respectively.

Further, in another configuration, an orientation of the second virtual camera may be set such that a direction in the virtual space corresponding to a depth direction for the image displayed on the first display device coincides with an up direction for the image displayed on the second display device.

According to the above, it is possible to display images of the virtual space viewed from different viewpoints, on the first display device and the second display device, respectively.

Further, another embodiment may be a display control method performed in the above display control system. Such a display control system may be configured by a single apparatus or a plurality of apparatuses. Further, another example may be a display control program which causes a computer to function as the sections included in the above-described display control system. Further, another example may be a display control apparatus including the sections included in the above-described display control system.

According to the present embodiment, it is possible to display images on a plurality of screens and to allow communication between users.

These and other objects, features, aspects and advantages of the exemplary embodiment will become more apparent from the following detailed description when taken in conjunction with the accompanying drawings.

BRIEF DESCRIPTION OF THE DRAWINGS

FIG. 3 is a non-limiting example of images displayed on a display device 2 and an LCD 71 of a terminal device 7 at the time when the game of the present embodiment is performed;

FIG. 6 illustrates a non-limiting example of a change in the orientation of the first virtual camera C1 at the time when the terminal device 7 is rotated in a roll direction (about Z-axis) from the reference attitude;

FIG. 10 shows a non-limiting example of how an input vector in accordance with an input direction of the right analog stick 72B is rotated in accordance with the attitude of the terminal device 7;

FIG. 11 shows a non-limiting example of a control of the orientation of the first virtual camera C1 based on the attitude of the terminal device 7 and a direction input operation using the right analog stick 72B;

FIG. 12 illustrates a control of two virtual cameras based on an operation of rotating the terminal device 7 in the yaw direction and an input in the left-right direction using the right analog stick 72B;

FIG. 13 illustrates a non-limiting example of a control of two virtual cameras based on an operation of rotating the terminal device 7 in the pitch direction;

FIG. 14 illustrates a non-limiting example of a control of two virtual cameras based on an operation of rotating the terminal device 7 in the roll direction;

FIG. 17 shows a non-limiting example of how a user object 81 is moved based on a direction input using a left analog stick 72A of the terminal device 7;

FIG. 18 illustrates a non-limiting example of a movement of the user object 81 at the time when a direction input operation is performed by using the left analog stick 72A while the terminal device 7 is being held vertically;

FIG. 19 shows a non-limiting example of a scene where the user object 81 has moved and arrived at a house object 82 indicated by a second user;

FIG. 20 shows a non-limiting example of a scene where the user object 81 has moved and arrived at a building object 89 arranged in the virtual space;

FIG. 22 shows a non-limiting example of an image displayed on the display device 2 when the second virtual camera C2 is set at a viewpoint C shown in FIG. 21;

FIG. 23 is a non-limiting example of an image displayed on the display device 2 when the second virtual camera C2 is set at a viewpoint D shown in FIG. 22;

FIG. 24 shows a non-limiting example of various types of data stored in a game apparatus 3.

DETAILED DESCRIPTION OF NON-LIMITING EXAMPLE EMBODIMENTS (An Example of Configuration of Game System)

Figure 1:
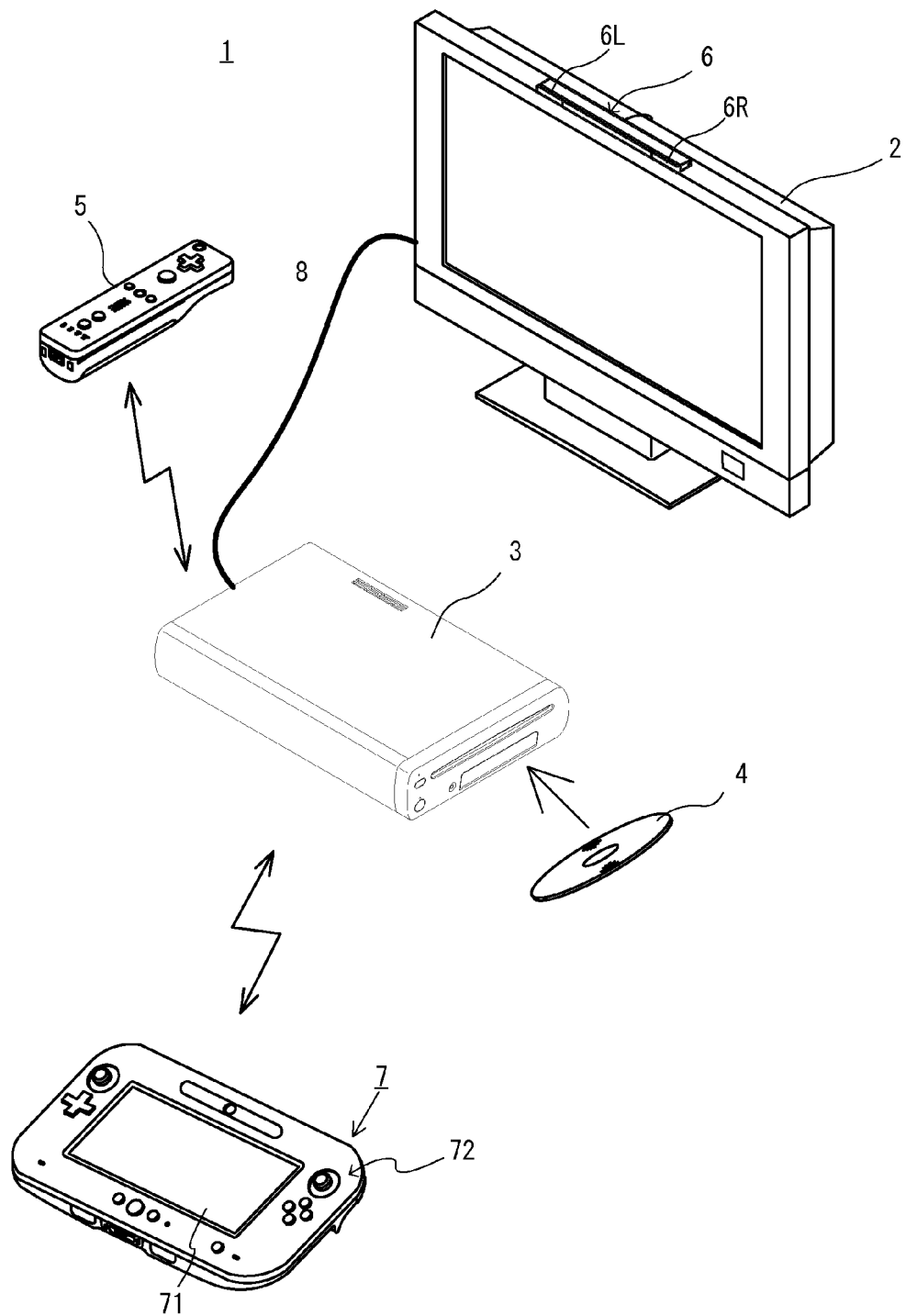
FIG. 1 is an external view showing a non-limiting example of a configuration of a game system 1.
Figure 2:
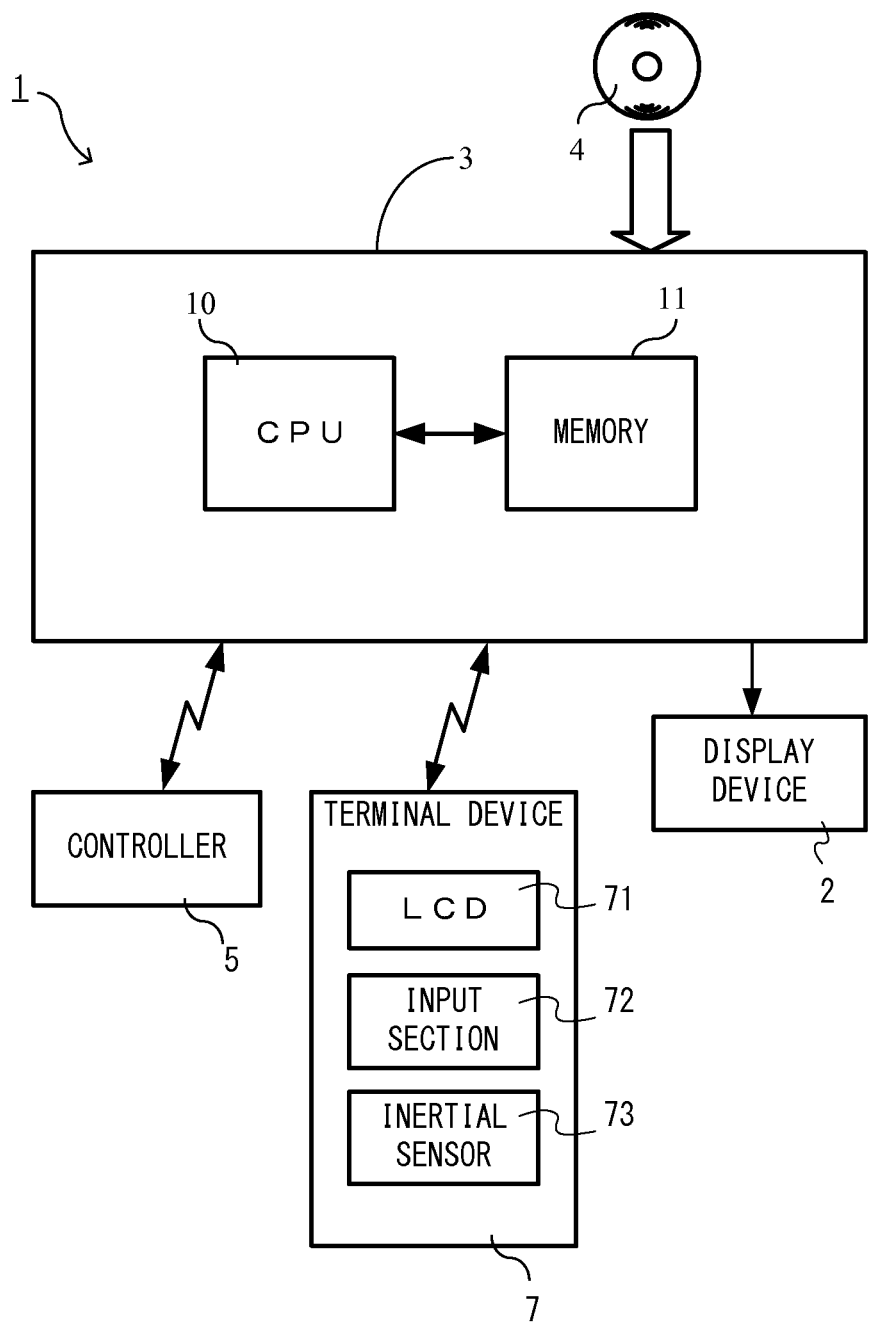
FIG. 2 is a block diagram showing a non-limiting example of a configuration of the game system 1.

Hereinafter, a game system 1 according to an embodiment will be described with reference to the drawings. FIG. 1 is an external view showing a non-limiting example of a configuration of the game system 1. FIG. 2 is a block diagram showing a non-limiting example of a configuration of the game system 1. As shown in FIG. 1 and FIG. 2, the game system 1 includes a stationary display device 2 (e.g., television), a stationary game apparatus 3, an optical disc 4, a controller 5, a marker device 6, and a terminal device 7.

The game apparatus 3 includes a CPU 10, a memory 11, and the like. When a program stored in a storage medium such as the optical disc 4 is loaded onto a memory, the CPU 10 executes the program loaded onto the memory, thereby performing processing described later. Then, the game apparatus 3 outputs an image as a result of the processing, to the display device 2 and the terminal device 7.

The terminal device 7 is a portable display device which is small enough to be held by both hands or one hand of a user. The user can move the terminal device 7 by holding it with his/her hand(s), or can locate the terminal device 7 at any position to use it. The terminal device 7 includes an LCD (liquid crystal display) 71 which is a display device. The terminal device 7 also includes an input section 72 such as an analog stick (left analog stick 72A, right analog stick 72B) for inputting a direction, an inertial sensor (gyro sensor, accelerometer, and the like) 73 capable of outputting attitude data in accordance with the attitude of the terminal device 7, and the like. The terminal device 7 and the game apparatus 3 are capable of wirelessly communicating with each other. The terminal device 7 receives data of an image generated by the game apparatus 3 from the game apparatus 3 and displays the image on the LCD 71. Moreover, the terminal device 7 transmits, to the game apparatus 3, operation data based on operations performed onto the terminal device 7 (operation onto the input section 72 and an operation to change the attitude of the terminal device 7).

The controller 5 is small enough to be held by a user, and is used to indicate a position on the screen of the display device 2. For example, by an imaging section provided in the controller 5 receiving infrared light from the marker device 6 arranged at predetermined position on the display device 2, the indicated position on the screen is detected. Alternatively, a sensor for detecting an attitude is provided in the controller 5, and a position on the screen may be indicated by the attitude of the controller 5 (for example, the middle point of the screen is indicated for the initial attitude, and the indicated position changes in accordance with a change in the attitude from the initial attitude).

The terminal device 7 is held by a first user, and the controller 5 is held by a second user, which will be described in detail later.

It should be noted that the game system 1 shown in FIG. 1 and FIG. 2 is merely an example and the processing described later may be performed in any apparatus.

(Outline of Processing)

Next, an outline of the processing performed in the game system 1 of the present embodiment will be described. FIG. 3 shows a non-limiting example of images displayed on the display device 2 and the LCD 71 of the terminal device 7 at the time when the game of the present embodiment is performed. In the present embodiment, the terminal device 7 is held by the first user, and the controller 5 is held by the second user.

As shown in FIG. 3, a user object 81, a house object (selection object) 82, and the like, which are arranged in a virtual space defined by an xyz coordinate system, are displayed on the display device 2. Moreover, a rock object 83, a tree object 84 (84a to 84c), and the like are arranged in the virtual space. The user object 81 is a virtual character operated by the first user using the terminal device 7. An image similar to that on the display device 2 is displayed on the LCD 71 of the terminal device 7. As shown in FIG. 3, the image displayed on the terminal device 7 is an image whose angle of view is narrower than that of the image displayed on the display device 2. The images displayed on the terminal device 7 and the display device 2 are generated by using a first virtual camera C1 and a second virtual camera C2 arranged in the virtual space, respectively, and are changed in accordance with an operation performed onto the terminal device 7.

Specifically, the orientations (attitudes) of the first virtual camera C1 and the second virtual camera C2 are controlled by the attitude of the terminal device 7 and an operation performed onto the right analog stick 72B of the terminal device 7. For example, when the Y-axis (axis along the up-down direction) of the XYZ coordinate system fixed for the terminal device 7 is parallel to the gravity direction, the X-axis (axis along the left-right direction) is parallel to the ground, and the Z-axis (axis perpendicular to the LCD 71) is directed to the screen of the display device 2, the images shown in FIG. 3 are displayed on the terminal device 7 and the display device 2. When the attitude of the terminal device 7 is changed relative to this attitude of the terminal device 7 (hereinafter, this may be referred to as "reference attitude"), the orientations of the first virtual camera C1 and the second virtual camera C2 are also changed. It should be noted that the attitude when the Y-axis is inclined by a predetermined angle relative to the ground in the real space may be defined as the reference attitude. When the user sees the screen while holding the terminal device 7, it may be easier to see the screen when the terminal device 7 is slightly inclined than when the terminal device 7 is held vertically (such that the Y-axis is parallel to the gravity direction). Therefore, such an attitude of the terminal device 7 may be defined as the reference attitude.

Hereinafter, control of the first virtual camera C1 by using operations performed onto the terminal device 7 (operation to change the attitude of the terminal device 7 itself, and an direction input operation performed onto the right analog stick 72B) will be described with reference to FIG. 4 to FIG. 10.

Figure 4:
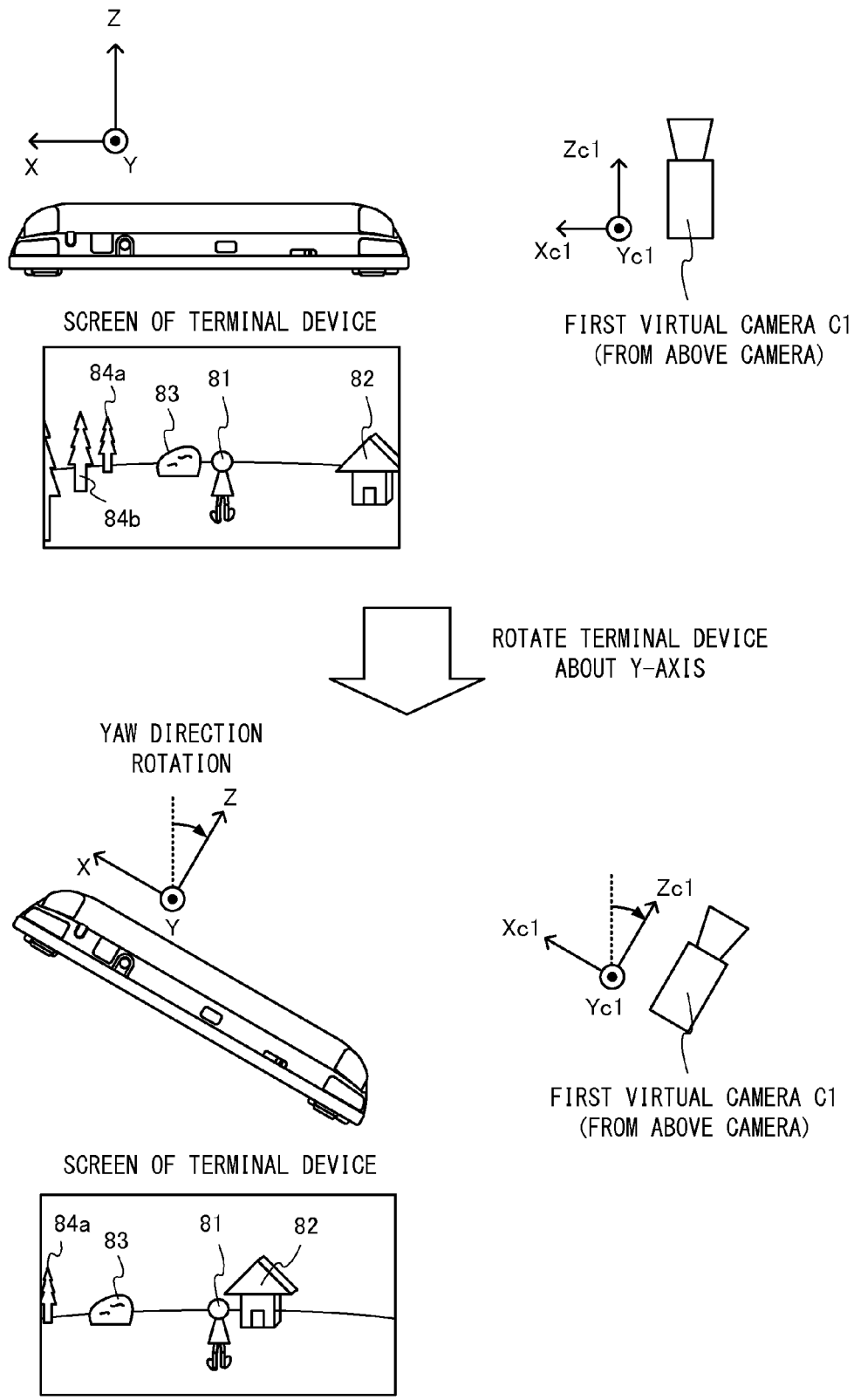
FIG. 4 illustrates a non-limiting example of a change in the orientation of a first virtual camera C1 at the time when the terminal device 7 is rotated in a yaw direction (about Y-axis) from a reference attitude.
Figure 5:
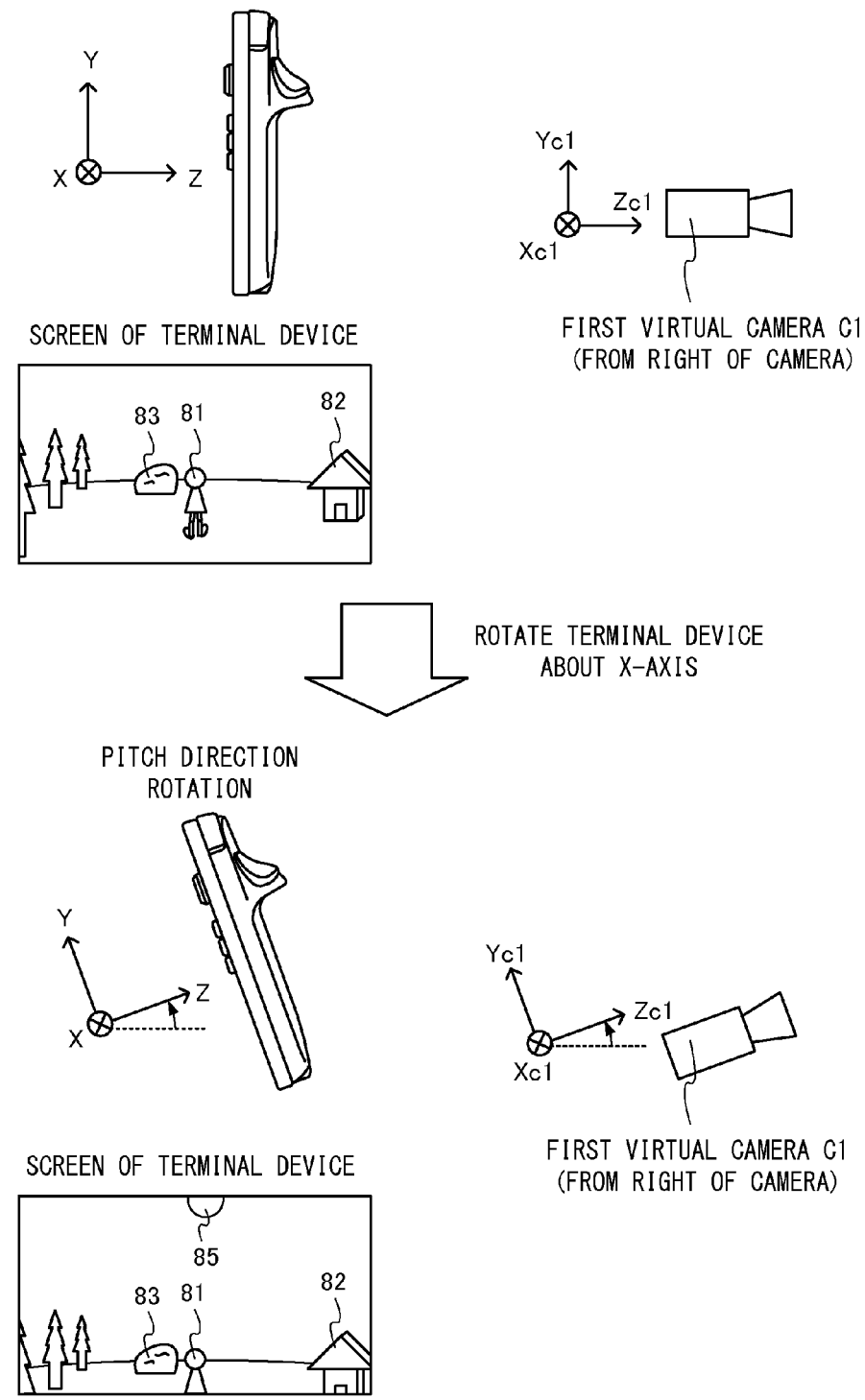
FIG. 5 illustrates a non-limiting example of a change in the orientation of the first virtual camera C1 at the time when the terminal device 7 is rotated in a pitch direction (about X-axis) from the reference attitude.

First, a change in the orientation of the first virtual camera C1 in accordance with a change in the attitude of the terminal device 7 will be described with reference to FIG. 4 to FIG. 6. FIG. 4 illustrates a non-limiting example of a change in the orientation of the first virtual camera C1 at the time when the terminal device 7 is rotated in a yaw direction (about Y-axis) from the reference attitude. FIG. 5 illustrates a non-limiting example of a change in the orientation of the first virtual camera C1 at the time when the terminal device 7 is rotated in a pitch direction (about X-axis) from the reference attitude. FIG. 6 illustrates a non-limiting example of a change in the orientation of the first virtual camera C1 at the time when the terminal device 7 is rotated in a roll direction (about Z-axis) from the reference attitude.

In FIG. 4, a view of the terminal device 7 seen from above in the real space is shown, and a view of the first virtual camera C1 seen from above the camera (from above in the virtual space) is shown. For example, as shown in FIG. 4, when the terminal device 7 is in the reference attitude, the imaging direction (Zc1-axis) of the first virtual camera C1 is directed to the rock object 83 which is arranged in the virtual space, and the rock object 83 is displayed in the central region in the left-right direction on the screen of the terminal device 7. From this state, when the rear surface of the terminal device 7 is directed rightward in the real space, the first virtual camera C1 is also directed rightward in the virtual space. Specifically, when the terminal device 7 is rotated in the yaw direction (about Y-axis), the first virtual camera C1 is rotated about Yc1-axis in an Xc1Yc1Zc1 coordinate system fixed for the first virtual camera C1, in accordance with the rotation angle. Here, Xc1-axis extends in the left direction relative to the first virtual camera C1, and Yc1-axis extends in the up direction relative to the first virtual camera C1, and Zc1-axis extends in the imaging direction of the first virtual camera C1. By the first virtual camera C1 rotating about Yc1-axis, the rock object 83, which has been displayed in the central region of the screen of the terminal device 7 before the rotation of the terminal device 7, is moved to a left region of the screen after the rotation of the terminal device 7. Moreover, the house object 82 having been displayed in a right region of the screen before the rotation is displayed near the center of the screen after the rotation of the terminal device 7. Moreover, a tree object 84b having been displayed in a left region of the screen before the rotation comes outside the imaging range of the first virtual camera C1 after the rotation, and is not displayed on the screen any more.

FIG. 5 shows the terminal device 7 viewed from the right direction and the first virtual camera C1 viewed from the right of the camera at that time. When the terminal device 7 is in the reference attitude as shown in FIG. 5, the imaging direction (Zc1-axis) of the first virtual camera C1 is parallel to the ground (xz-plane) in the virtual space. Accordingly, the horizon in the virtual space is displayed on the screen of the terminal device 7, near the center in the up-down direction of the screen. When the rear surface of the terminal device 7 is directed upward in the real space from this state, the first virtual camera C1 is also directed upward in the virtual space. Specifically, when the terminal device 7 is rotated in the pitch direction (about X-axis), the first virtual camera C1 is rotated about Xc1-axis in accordance with the rotation angle. Accordingly, the rock object 83 and the like, which have been displayed in the central region in the up-down direction of the screen of the terminal device 7 before the rotation of the terminal device 7, are displayed, after the rotation of the terminal device 7, in a lower region in the up-down direction of the screen. A sun object 85, which was not displayed on the screen before the rotation because it was located upper than and outside the screen in the virtual space, has entered the imaging range of the first virtual camera C1 after the rotation, and is displayed on the screen.

Moreover, FIG. 6 shows a view of the terminal device 7 viewed from the front thereof, and a view of the first virtual camera C1 viewed from the rear of the camera at that time. As shown in FIG. 6, when the terminal device 7 is in the reference attitude, the imaging direction (Zc1-axis) of the first virtual camera C1 is not rotated, and Xc1-axis fixed for the first virtual camera C1 is parallel to the ground in the virtual space. When the terminal device 7 is rotated in the roll direction (about Z-axis) from this state, the first virtual camera C1 is rotated about Zc1-axis in accordance with the rotation angle. Specifically, the first virtual camera C1 is rotated about Zc1-axis (imaging axis), in the same rotation direction as the rotation direction about Z-axis of the terminal device 7, by the same rotation amount as the rotation amount about Z-axis of the terminal device 7. Accordingly, the image generated by using the first virtual camera C1 is rotated in a reverse direction of the rotation direction of the terminal device 7, about the central axis of the screen of the terminal device 7. As a result, the rotation in the roll direction of the terminal device 7 is canceled, and the image is not apparently rotated in the roll direction on the screen of the terminal device 7 when viewed by the first user. In other words, the ground (xz-plane) in the virtual space included in the image displayed on the screen of the terminal device 7 is parallel to the ground in the real space, and the up-down direction in the virtual space is parallel to the gravity direction in the real space.

Figure 8:
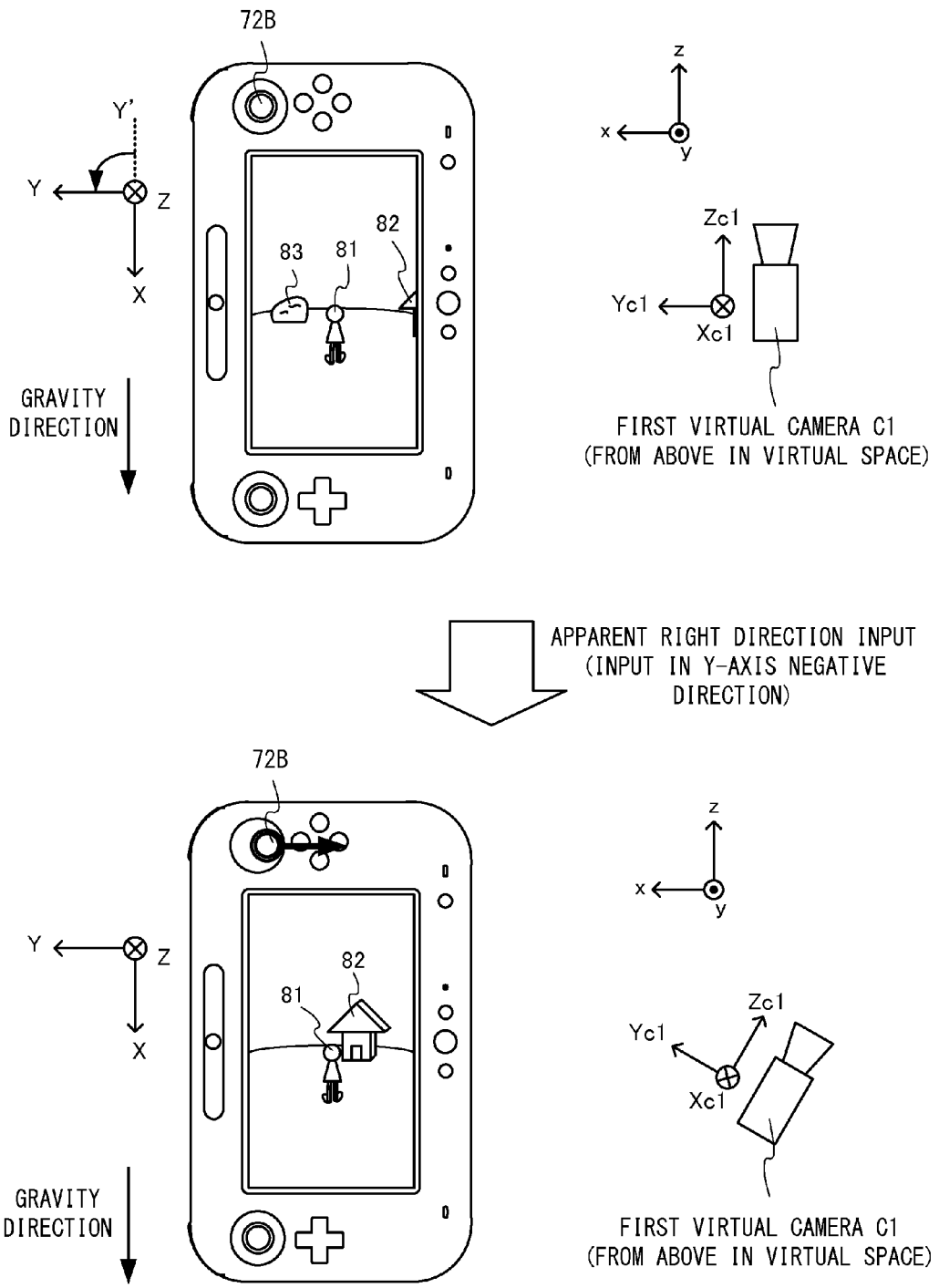
FIG. 8 illustrates a non-limiting example of a change in the orientation of the first virtual camera C1 at the time when a direction input is performed by using the right analog stick 72B, while the terminal device 7 is being held such that X-axis thereof is directed toward the gravity direction (vertical holding)

Therefore, for example, when the first user rotates the terminal device 7 by 90 degrees counterclockwise in the roll direction, and thus X-axis is oriented toward the gravity direction (holding the terminal device 7 in such an attitude may be referred to as "vertical holding"), the image is rotated by 90 degrees clockwise, and the image having longer sides in the up-down direction is displayed on the terminal device 7 (see FIG. 8).

Rotations of the yaw direction, the pitch direction, and the roll direction of the terminal device 7 can be calculated, based on a physical quantity detected by the inertial sensor 73 of the terminal device 7, such as an angular velocity detected by a gyro sensor and/or a gravitational acceleration detected by an accelerometer. For example, by integrating by time the angular velocities about X, Y, and Z-axes detected by a gyro sensor, the attitude of the terminal device 7 (rotations about the respective axes) can be calculated. It should be noted that the detection of the attitude of the terminal device 7 is not necessarily performed by the inertial sensor but other methods (for example, an image of the terminal device 7 is taken by a camera, and the terminal device 7 is detected based on the taken image, and the like) may be employed.

Figure 7:
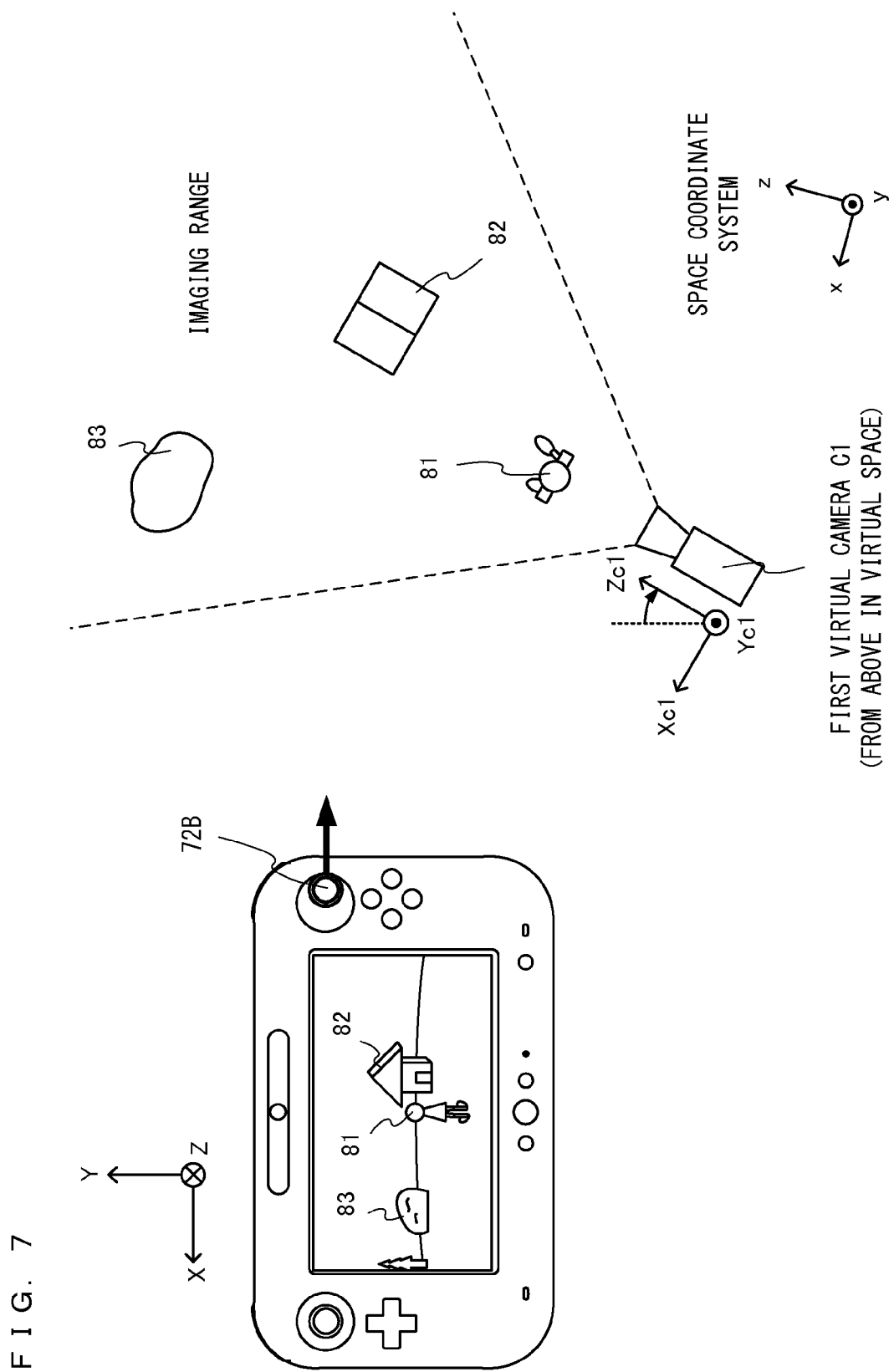
FIG. 7 illustrates a non-limiting example of a change in the orientation of the first virtual camera C1 at the time when a right direction (X-axis negative direction) is inputted by using a right analog stick 72B.

Next, control of the orientation of the first virtual camera C1 based on a direction input using the right analog stick 72B will be described. FIG. 7 illustrates a non-limiting example of a change in the orientation of the first virtual camera C1 at the time when a right direction (X-axis negative direction) is inputted by using the right analog stick 72B.

As shown in FIG. 7, when the right direction is inputted by using the right analog stick 72B (when the right analog stick 72B is slid in the right direction), the first virtual camera C1 is rotated in the yaw direction in accordance with the input amount (slide amount and slide time period). Specifically, the first virtual camera C1 is rotated about an axis parallel to y-axis in the virtual space. Therefore, when the right direction is inputted using the right analog stick 72B, the first virtual camera C1 is directed rightward in the virtual space, and the rock object 83 having been displayed near the center in the left-right direction of the screen before the input is now displayed in a left region in the left-right direction of the screen after the input. In FIG. 7, since y-axis fixed in the virtual space and Yc1-axis fixed for the first virtual camera C1 are parallel to each other, the first virtual camera C1 is rotated about Yc1-axis.

When the left direction is inputted by using the right analog stick 72B, the first virtual camera C1 is reversely rotated about y-axis. Therefore, when the left direction is inputted by using the right analog stick 72B, the first virtual camera C1 is directed leftward in the virtual space.

Further, in FIG. 7, when an upper right direction is inputted by using the right analog stick 72B, for example, only a component in the right direction of the input is used for rotating the first virtual camera C1 in the yaw direction. Further, in FIG. 7, when an up-down direction is inputted by using the right analog stick 72B, the first virtual camera C1 is not rotated in the yaw direction. That is, the first virtual camera C1 is rotated in the yaw direction (left-right direction in the virtual space) in accordance with an input in the left-right direction using the right analog stick 72B, whereas the first virtual camera C1 is not rotated in the yaw direction, the pitch direction (up-down direction in the virtual space), or the roll direction, for an input in the up-down direction using the right analog stick 72B.

FIG. 8 illustrates a non-limiting example of a change in the orientation of the first virtual camera C1 at the time when a direction input is performed by using the right analog stick 72B, while the terminal device 7 is being held such that X-axis thereof is oriented toward the gravity direction (vertical holding). As shown in FIG. 8, in the case where the terminal device 7 is being held such that X-axis thereof is oriented in the gravity direction, that is, in the case where the terminal device 7 has been rotated by 90 degrees counter-clockwise (about Z-axis) from the reference attitude shown in FIG. 3, when the right analog stick 72B is slid in the Y-axis negative direction (the right direction relative to the gravity direction), the first virtual camera C1 is rotated about y-axis. By the first virtual camera C1 being rotated about y-axis, the first virtual camera C1 is directed rightward in the virtual space. As a result, the house object 82, which was only partially displayed in a right part of the screen before the operation of the right analog stick 72B, is displayed near the center in the left-right direction of the screen after the operation.

In the state of the vertical holding shown in FIG. 8, when the right analog stick 72B is slid in the Y-axis positive direction (the left direction relative to the gravity direction), the first virtual camera C1 is directed leftward in the virtual space. Further, in the state of vertical holding shown in FIG. 8, when the X-axis direction (the gravity direction) is inputted by using the right analog stick 72B, the orientation of the first virtual camera C1 is not changed.

Figure 9:
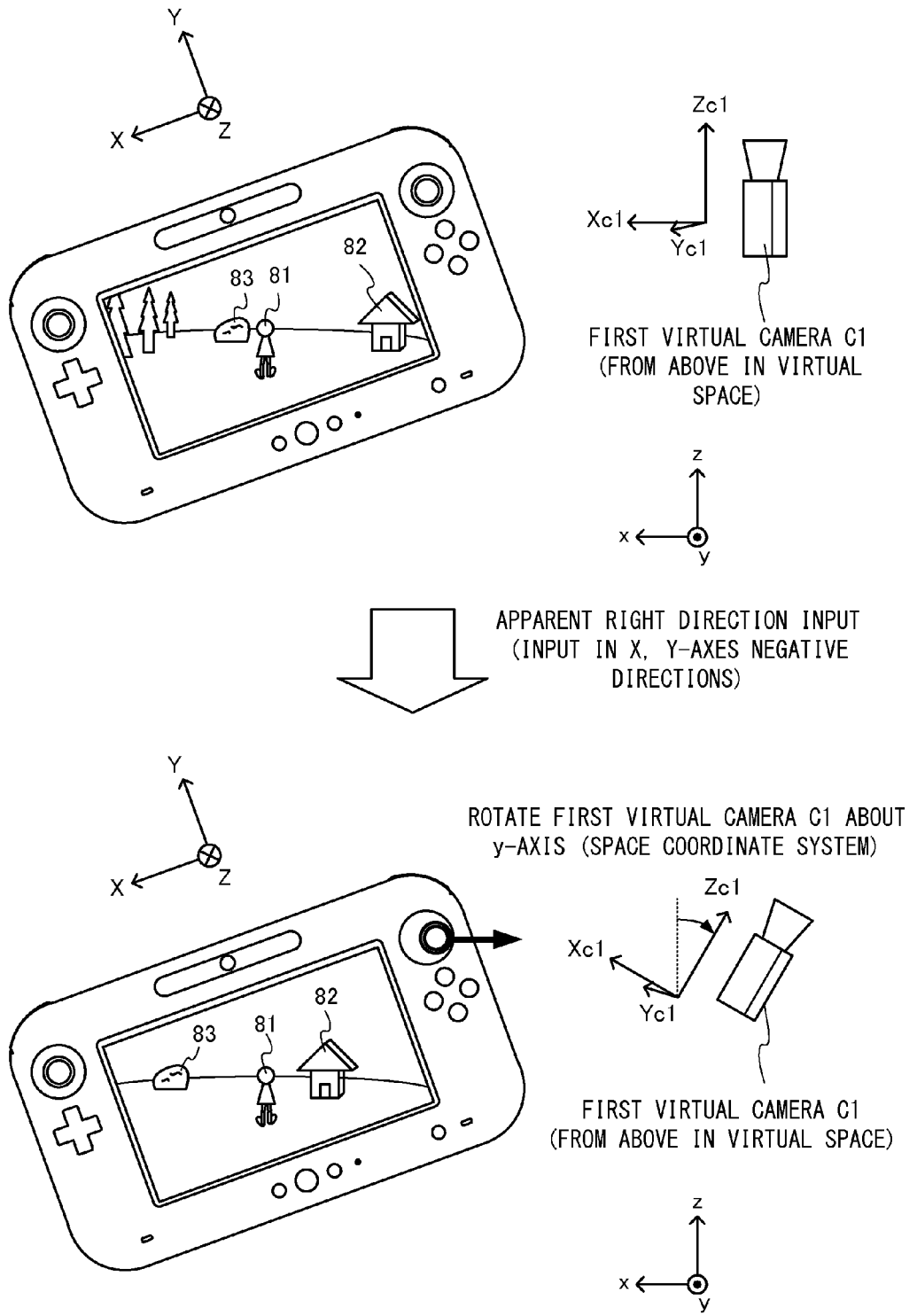
FIG. 9 illustrates a non-limiting example of a change in the orientation of the first virtual camera C1 at the time when a direction input is performed by using the right analog stick 72B, while the terminal device 7 is being held (inclined holding) such that X-axis thereof is inclined by a predetermined angle relative to the horizontal direction in the real space.

FIG. 9 illustrates a non-limiting example of a change in the orientation of the first virtual camera C1 at the time when a direction input is performed by using the right analog stick 72B, while the terminal device 7 is being held (inclined holding) such that X-axis thereof is inclined by a predetermined angle relative to the horizontal direction in the real space. As shown in FIG. 9, when the terminal device 7 is being held, rotated in the roll direction (about Z-axis) by a predetermined angle (for example, 30 degrees) from the reference attitude, the first virtual camera C1 is also rotated in the roll direction (about Zc1-axis). In this state, when the right analog stick 72B is slid to an apparent right direction (lower right direction in the reference attitude), the first virtual camera C1 is rotated about y-axis in the virtual space. That is, when the right analog stick 72B is slid to an apparent right direction, the first virtual camera C1 is directed rightward in the virtual space. Accordingly, the house object 82, which was displayed in a right part of the screen before the operation of the right analog stick 72B, is moved leftward in the screen after the operation.

As described above, even when the attitude of the terminal device 7 is changed, the first virtual camera C1 is controlled so as to be directed toward a direction in the virtual space that corresponds to an apparent input direction by the right analog stick 72B. That is, the orientation of the first virtual camera C1 is changed such that the changed direction of the orientation of the first virtual camera C1 agrees with the apparent input direction of the analog stick. Here, the "apparent input direction" means a sliding direction of the right analog stick 72B based on the real space. When the terminal device 7 is in the reference attitude, the apparent input direction coincides with the direction of the input vector indicating the input direction by the right analog stick 72B detected by the terminal device 7. On the other hand, when the terminal device 7 is rotated about Z-axis from the reference attitude, the apparent input direction differs from the direction of the input vector. Specifically, an input vector indicating the input direction by the right analog stick 72B is rotated in accordance with the attitude of the terminal device 7, and the orientation of the first virtual camera C1 is changed based on the rotated vector.

FIG. 10 shows a non-limiting example of how an input vector in accordance with the input direction by the right analog stick 72B is rotated in accordance with the attitude of the terminal device 7. An operation performed onto the right analog stick 72B of the terminal device 7 is calculated as an input vector. As shown in FIG. 10, the input vector in accordance with the input direction by the right analog stick 72B is expressed as coordinate values in an IxIy coordinate system. Ix-axis coincides with the X-axis negative direction for the terminal device 7, and Iy-axis coincides with the Y-axis positive direction for the terminal device 7. In the case where the terminal device 7 is rotated by θr in the roll direction (about Z-axis), when the values of the input vector are, for example, (0.707, −0.707), a correction vector obtained by rotating the input vector by θr is calculated. Then, the correction vector is used for rotation about y-axis for the first virtual camera C1. More specifically, for a rotation about y-axis for the first virtual camera C1 (rotation in the yaw direction), only an input in the apparent left-right direction using the right analog stick 72B is used. Therefore, the first virtual camera C1 is rotated about y-axis in accordance with the value of the Ix-axis component of the correction vector.

For example, in the case where the rotation angle θr in the roll direction of the terminal device 7 is 90 degrees (in the case of vertical holding), when the values of the input vector are (0, −1.0), the correction vector obtained by rotating the input vector by 90 degrees is (1, 0). Therefore, in this case, the first virtual camera C1 is rotated about y-axis, regarding that the right direction by the right analog stick 72B has been inputted. Moreover, in the case where the rotation angle θr in the roll direction of the terminal device 7 is 90 degrees, for example, when the values of the input vector are (1, 0), the correction vector obtained by rotating the input vector by 90 degrees is (0, 1). Therefore, in this case, the first virtual camera C1 is not rotated about y-axis, regarding that the up direction by the right analog stick 72B has been inputted.

As described above, a correction vector is calculated by correcting an input vector indicating an input direction by the right analog stick 72B, in accordance with the attitude of the terminal device 7. Then, based on the correction vector, the first virtual camera C1 is rotated about the up-down direction axis in the virtual space. Accordingly, even when the attitude of the terminal device 7 is changed, it is possible to direct the first virtual camera C1 in the apparent input direction by the right analog stick 72B (horizontal direction relative to the gravity direction).

As described above, in the present embodiment, the orientation of the first virtual camera C1 is controlled by an operation of changing the attitude of the terminal device 7 (first operation), and by a direction input operation using the right analog stick 72B (second operation). As shown in FIG. 11, by combining the camera control by the first operation and the camera control by the second operation, the orientation of the first virtual camera C1 is determined.

(Game Operation Using Terminal Device and Display Device)

Next, a game operation performed by a plurality of people using images displayed on the terminal device 7 and the display device 2 will be described with reference to FIG. 12 to FIG. 19. First, with reference to FIG. 12 to FIG. 14, images displayed on the terminal device 7 and the display device 2 will be described.

FIG. 12 illustrates a non-limiting example of an operation of rotating the terminal device 7 in the yaw direction, and a control of two virtual cameras based on an input in the left-right direction using the right analog stick 72B. As described above, the orientation of the first virtual camera C1 for generating an image to be displayed on the LCD 71 of the terminal device 7 is changed, in accordance with rotation of the terminal device 7 in the yaw direction (about Y-axis) and an input in the left-right direction by the right analog stick 72B. Similarly to the first virtual camera C1, the orientation of the second virtual camera C2 for generating an image to be displayed on the display device 2 is changed, in accordance with rotation of the terminal device 7 in the yaw direction and an input in the left-right direction by the right analog stick 72B. That is, with respect to the yaw direction, the second virtual camera C2 operates in conjunction with the first virtual camera C1. Specifically, the rotation about Yc1-axis in the coordinate system fixed for the first virtual camera C1 is equal to the rotation about Yc2-axis in an Xc2Yc2Zc2 coordinate system fixed for the second virtual camera C2. However, in order to avoid an abrupt change, the second virtual camera C2 may be configured to follow the first virtual camera C1 over a predetermined time period. It should be noted that Xc2-axis extends in the left direction relative to the second virtual camera C2, Yc2-axis extends in the up direction relative to the second virtual camera C2, and Zc2-axis extends in the imaging direction of the second virtual camera C2.

FIG. 13 illustrates a non-limiting example of a control of two virtual cameras based on an operation of rotating the terminal device 7 in the pitch direction. FIG. 14 illustrates a non-limiting example of a control of two virtual cameras based on an operation of rotating the terminal device 7 in the roll direction. As shown in FIG. 13, when the terminal device 7 is rotated in the pitch direction (about X-axis), the first virtual camera C1 is also rotated in the pitch direction (about Xc1-axis). On the other hand, even when the terminal device 7 is rotated in the pitch direction, the second virtual camera C2 is not rotated in the pitch direction (about Xc2-axis).

Further, as shown in FIG. 14, when the terminal device 7 is rotated in the roll direction (about Z-axis), the first virtual camera C1 is also rotated in the roll direction (about Zc1-axis). On the other hand, even when the terminal device 7 is rotated in the roll direction, the second virtual camera C2 is not rotated in the roll direction (about Zc2-axis). That is, with respect to the pitch direction and the roll direction, the second virtual camera C2 does not operate in conjunction with the first virtual camera C1.

As described above, by rotating the terminal device 7 in the yaw direction and/or by sliding the right analog stick 72B in the left-right direction, it is possible to cause the first virtual camera C1 to operate in conjunction with the second virtual camera C2 with respect to the yaw direction. Moreover, by rotating the terminal device 7 in the pitch direction and/or the roll direction, i.e., by directing the rear surface of the terminal device 7 in a desired direction upward, downward, leftward, and/or rightward, the first user holding the terminal device 7 can view the desired direction in the up, down, left, and/or right directions in the virtual space. Therefore, the first user can have a sweeping view of the virtual space in accordance with the operation performed onto the terminal device 7 held by the first user.

On the other hand, when the terminal device 7 is rotated in the yaw direction, the second virtual camera C2 is also rotated in the yaw direction (about y-axis), but even when the terminal device 7 is rotated in the pitch direction or the roll direction, the second virtual camera C2 is not rotated in the pitch direction or the roll direction. Therefore, even if the first user rotates the terminal device 7 in the pitch direction or the roll direction, the range of the virtual space displayed on the display device 2 is not changed. Thus, the image is easy to see for the second user viewing the display device 2. That is, if an image on the display device 2 is swung upwardly or downwardly or rotated by the first user directing the terminal device 7 upward or downward or rotating it in the roll direction, the image becomes difficult to see for the second user. However, in the present embodiment, since the second virtual camera C2 operates in conjunction with the first virtual camera C1 only in the yaw direction, the image is easy to see for the second user viewing the stationary display device 2.

Figure 15:
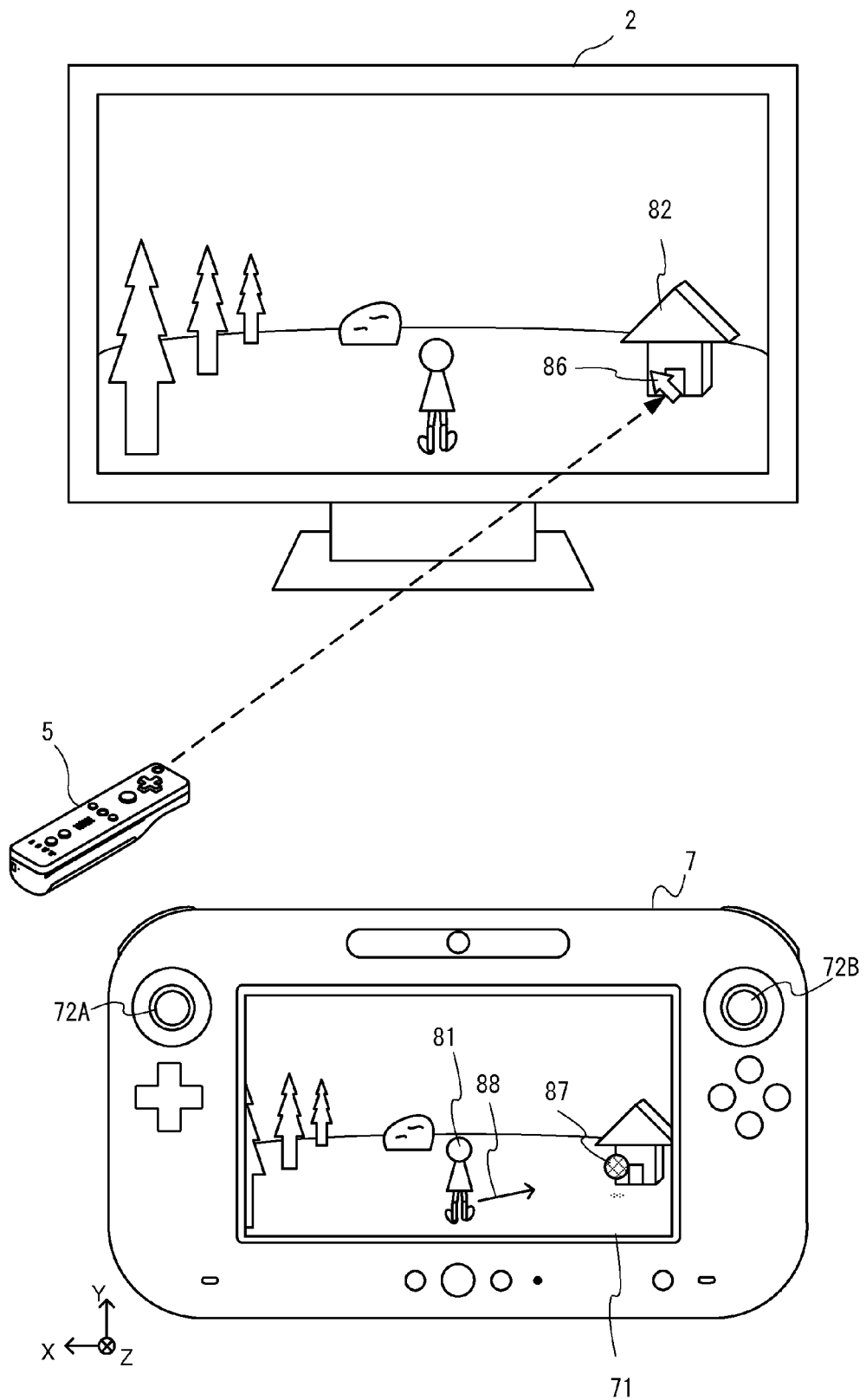
FIG. 15 shows a non-limiting example of images displayed on the terminal device 7 and the display device 2 when a position on the screen of the display device 2 is indicated by using a controller 5.

Next, description will be given of a case where the second user indicates a position on the screen of the display device 2 using the controller 5 while images of the virtual space are being displayed on the terminal device 7 and the display device 2 as described above. FIG. 15 shows a non-limiting example of images displayed on the terminal device 7 and the display device 2 when a position on the screen of the display device 2 is indicated by using the controller 5.

As shown in FIG. 15, when the second user directs the tip of the controller 5 to the display device 2, a pointer 86 which indicates a position on the screen is displayed on the screen of the display device 2. When the pointer 86 is displayed on the display device 2, an indicated object 87 is displayed on the LCD 71 of the terminal device 7. The indicated object 87 is an object having a predetermined three dimensional shape (sphere, for example), and is arranged at a three dimensional position in the virtual space corresponding to the position on the screen of the display device 2 indicated by the pointer 86. Then, a taken image of the virtual space including the indicated object 87 is displayed on the LCD 71 of the terminal device 7. Moreover, an indicator 88 indicating the position of the indicated object 87 is displayed on the terminal device 7. The indicator 88 indicates the positional relationship between the user object 81 and the indicated object 87, and is displayed as an arrow extending from the user object 81 toward the indicated object 87, for example. Since the indicator 88 and the indicated object 87 are displayed on the terminal device 7, the first user viewing the terminal device 7 can know the position of the indicated object 87, that is, the position indicated by the second user.

Figure 16:
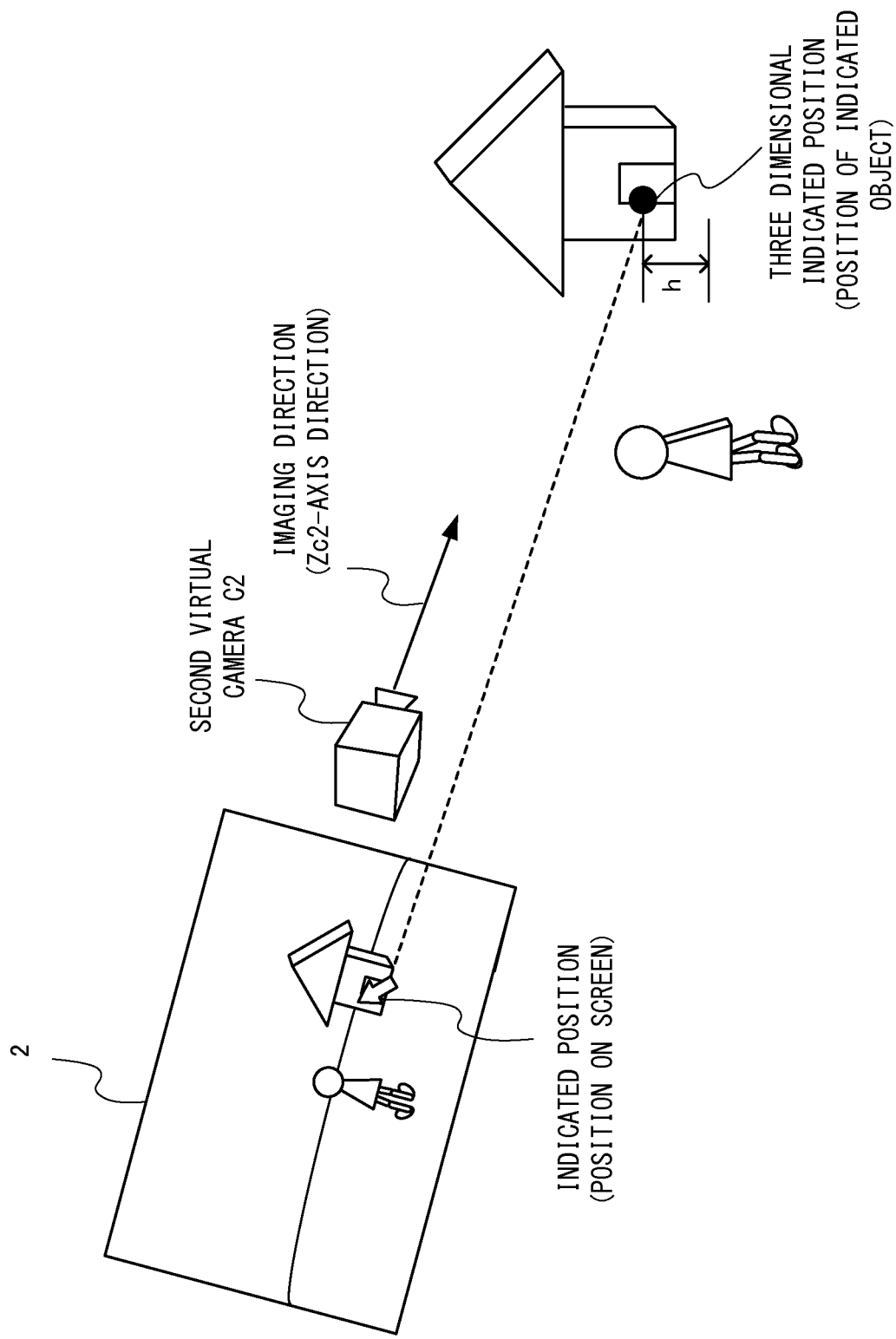
FIG. 16 illustrates a non-limiting example of a position at which an indicated object 87 is located.

FIG. 16 illustrates a non-limiting example of a position at which the indicated object 87 is located. First, the indicated position on the screen of the display device 2 indicated by using the controller 5 is calculated. For example, by the imaging section of the controller 5 receiving light from the marker device 6 arranged near (e.g., above the screen) the display device 2, the indicated position (two dimensional) on the screen of the display device 2 is calculated. Next, as shown in FIG. 16, a straight line passing through the indicated position and extending parallel to Zc2-axis for the second virtual camera C2 is calculated. Then, a point at which the straight line intersects a plane which is at a predetermined height h from the ground (xy plane) in the virtual space is calculated as the three dimensional indicated position. Then, the indicated object 87 is located at the three dimensional indicated position calculated in this manner.

FIG. 17 shows a non-limiting example of how the user object 81 is moved based on a direction input using the left analog stick 72A of the terminal device 7. As shown in FIG. 17, by inputting a direction using the left analog stick 72A of the terminal device 7, the first user can move the user object from the position 81' to the position 81. The first virtual camera C1 and the second virtual camera C2 also move in the virtual space in accordance with the movement of the user object 81. For example, when an up direction (Y-axis positive direction) is inputted by using the left analog stick 72A, the user object 81 is moved forward in the virtual space (i.e., is moved to the depth direction in the screen of the terminal device 7), and the two virtual cameras also move accordingly. When a right direction (X-axis negative direction) is inputted by using the left analog stick 72A, the user object 81 is moved in the right direction in the virtual space, and the two virtual cameras also move accordingly. Further, as shown in FIG. 17, when an upper right direction is inputted by using the left analog stick 72A, the user object 81 is moved to the right forward direction. In this manner, the first user can move the user object 81 in any desired direction in the virtual space, through a direction input using the left analog stick 72A.

In the case where the terminal device 7 is being held vertically, when a direction input is performed by using the left analog stick 72A, the user object 81 is moved in an apparent input direction of the left analog stick 72A, as in the case of the operation using the right analog stick 72B. FIG. 18 illustrates a non-limiting example of a movement of the user object 81 when a direction input operation is performed by using the left analog stick 72A while the terminal device 7 is being held vertically. As shown in FIG. 18, when the left analog stick 72A is slid in the X-axis negative direction while the terminal device 7 is being held vertically, the apparent sliding direction is the up direction in the real space. Therefore, in this case, it is regarded that an up direction has been inputted by using the left analog stick 72A, and the user object 81 is not moved in the right direction but is moved forward (i.e., the depth direction in the screen) in the virtual space. Specifically, as in the case of the operation using the right analog stick 72B described above, an input vector corresponding to the input direction by the left analog stick 72A is rotated in accordance with the rotation about Z-axis for the terminal device 7. Then, the movement direction of the user object 81 is determined in accordance with the rotated vector.

FIG. 19 shows a non-limiting example of a scene where the user object 81 has moved and arrived at the house object 82 indicated by the second user. Here, when the user object 81 has arrived at the house object 82, a game A is selected. The house object 82 is an object for selecting a game to be executed, and a game corresponding to the house object 82 is prepared in advance. Further, in the virtual space, a plurality of selection objects respectively associated with different types of games are arranged in addition to the house object 82 which corresponds to the game A.

FIG. 20 shows a non-limiting example of a scene where the user object 81 has moved and arrived at a building object 89 arranged in the virtual space. As shown in FIG. 20, the building object 89 corresponding to a game B is arranged in the virtual space, and when the user object 81 arrives at the building object 89, the game B is selected.

As described above, by the first user operating the user object 81 to select a selection object associated with each game, the game is executed. By indicating a position on the screen of the display device 2 using the controller 5 while viewing the image displayed on the display device 2, the second user indicates a selection object (game) which he or she wishes the first user to select. By looking at the indicated object 87 displayed on the LCD 71 of the terminal device 7, the first user can know the selection object indicated by the second user. Then, the first user operates the user object 81 to select the selection object, thereby starting the game.

As described above, the indicated object 87 is located at a position in the virtual space corresponding to the indicated position on the screen of the display device 2 and the indicated object 87 is displayed on the terminal device 7, whereby communication between the users can be performed.

It should be noted that the above embodiment is merely an example, and various modifications may be performed as described below for example.

For example, in the above embodiment, the first virtual camera C1 is rotated in the yaw direction in accordance with an input in the apparent left-right direction (left-right direction relative to the gravity direction), which is performed by using the right analog stick 72B. In another embodiment, the first virtual camera C1 may be rotated in the pitch direction, in accordance with an input in the apparent up-down direction (direction parallel to the gravity). That is, in accordance with an input in said up-down direction, the first virtual camera C1 may be directed toward the up-down direction in the virtual space. In this case, an input vector indicating the input direction by the right analog stick 72B is corrected (rotated) in accordance with the attitude of the terminal device 7 to calculate a correction vector, and the first virtual camera C1 is rotated in the yaw direction in accordance with the left-right direction component of the correction vector. Further, the first virtual camera C1 is rotated in the pitch direction in accordance with the up-down direction component of the correction vector.

In the above embodiment, a direction input is performed using an analog stick capable of inputting any direction, and the input direction performed by using the analog stick is corrected in accordance with the attitude of the terminal device 7. In another embodiment, a direction input may performed using a cross key, a plurality of operation buttons arranged in a predetermined pattern, or any other input means, and the input direction may be corrected in accordance with the attitude of the terminal device 7.

In the above embodiment, the second virtual camera C2 operates in conjunction with the first virtual camera C1 only with respect to the yaw direction. However, in another embodiment, the second virtual camera C2 may operate in conjunction with the first virtual camera C1 also with respect to the pitch direction and the roll direction. Moreover, in another embodiment, the second virtual camera C2 may operate in conjunction with the first virtual camera C1 only with respect to a predetermined direction. That is, the first virtual camera C1 may rotate in a plurality of directions (roll, pitch, and yaw) in accordance with an operation onto the terminal device 7, whereas the second virtual camera C2 may rotate in a predetermined direction among the plurality of directions.

In the above embodiment, the first virtual camera C1 and the second virtual camera C2 are arranged in the virtual space, and the first virtual camera C1 operates in conjunction with the second virtual camera C2. An image of the virtual space viewed from the first virtual camera C1 is displayed on the terminal device 7, and an image of the virtual space viewed from the second virtual camera C2 is displayed on the display device 2. In another embodiment, an image viewed from the first virtual camera C1 may be displayed on the terminal device 7 and the display device 2, without setting the second virtual camera C2.

Further, in the above embodiment, the imaging direction of the second virtual camera C2 is made parallel (a predetermined angle difference is allowed) to the imaging direction of the first virtual camera C1, whereby an image (image of the virtual space viewed from behind the user object 81) similar to the image displayed on the terminal device 7 is displayed on the display device 2. That is, in the above embodiment, the direction in the virtual space corresponding to the depth direction for the display device 2 coincides with the direction in the virtual space corresponding to the depth direction for the terminal device 7. However, in another embodiment, the position and the imaging direction of the second virtual camera C2 may not coincide with (substantially coincide with) those of the first virtual camera C1.

Figure 21:
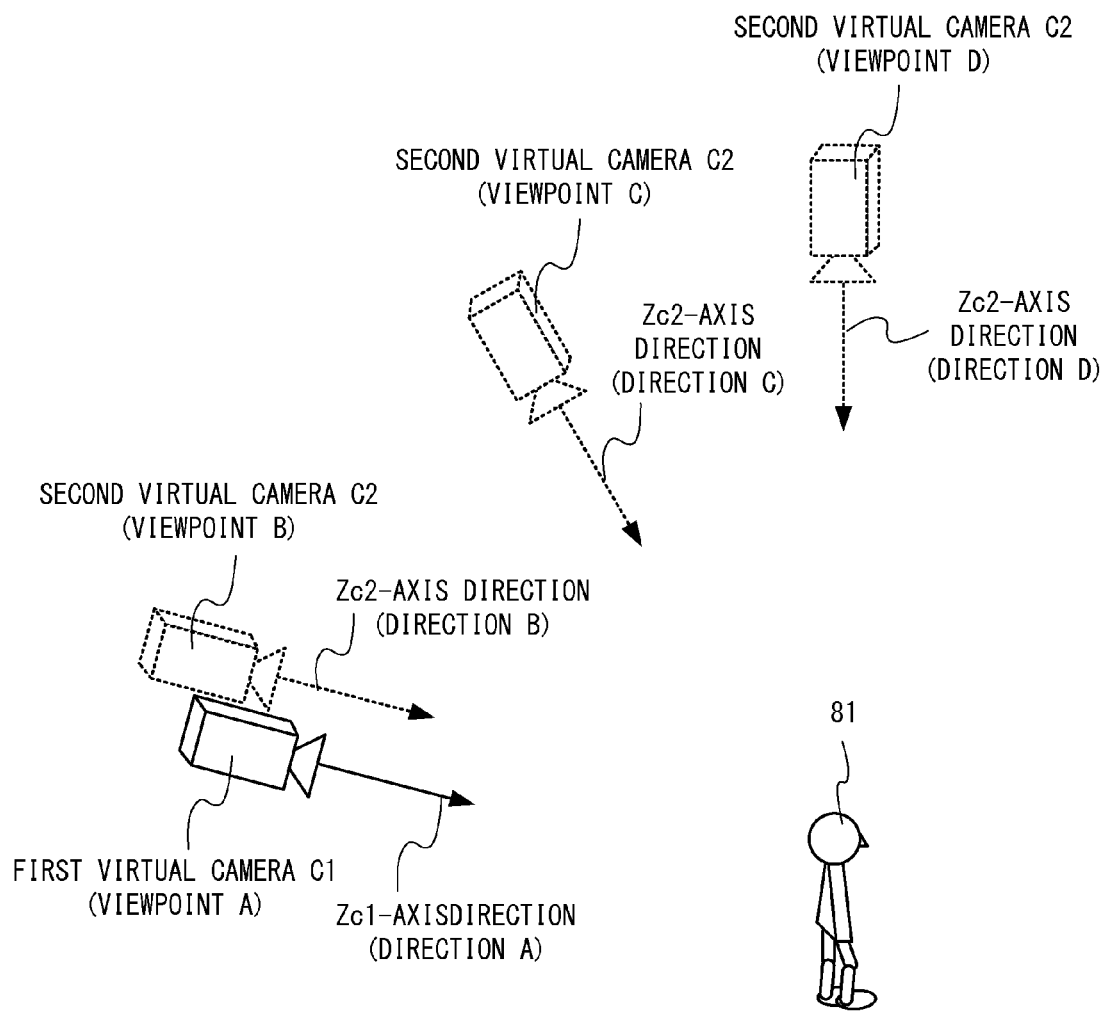
FIG. 21 shows non-limiting various examples of positional relationships between the first virtual camera C1 and the second virtual camera C2 and imaging directions (sight line directions) thereof.

FIG. 21 shows non-limiting various examples of the positional relationship between the first virtual camera C1 and the second virtual camera C2 and the imaging directions (sight line directions) thereof. As in the above embodiment, the second virtual camera C2 may be located at a viewpoint B which (substantially) coincides with a viewpoint A of the first virtual camera C1, and an imaging direction B of the second virtual camera C2 may (substantially) coincide with an imaging direction A of the first virtual camera C1. Specifically, the viewpoint B of the second virtual camera C2 may coincide with the viewpoint A of the first virtual camera C1 with respect to the left-right direction and the up-down direction. Alternatively, the viewpoint B of the second virtual camera C2 may coincide with the viewpoint A of the first virtual camera C1 with respect to the left-right direction but may not coincide with that of the first virtual camera C1 with respect to the up-down direction. In this case, as shown in FIG. 3, substantially the same images are displayed on the display device 2 and the terminal device 7, and the direction in the virtual space indicated by the depth direction for the image on the display device 2 corresponds to the depth direction for the image displayed on the terminal device 7. In other words, the imaging direction of the first virtual camera C1 and the imaging direction of the second virtual camera C2 may be set to be substantially parallel (closer to parallel than perpendicular) to each other.

Moreover, as shown in FIG. 21, the second virtual camera C2 may be located at a viewpoint C, and the imaging direction thereof may be set in a direction C. Further, the second virtual camera C2 may be located at a viewpoint D, and the imaging direction thereof may be set in a direction D. That is, the imaging direction of the second virtual camera C2 may be set to be substantially perpendicular (closer to perpendicular than parallel) to the ground in the virtual space.

FIG. 22 shows a non-limiting example of an image displayed on the display device 2 when the second virtual camera C2 is set at the viewpoint C shown in FIG. 21. FIG. 23 shows a non-limiting example of an image displayed on the display device 2 when the second virtual camera C2 is set at the viewpoint D shown in FIG. 22. As shown in FIG. 22, in the display device 2, an image viewed from an upper position in the virtual space than in the terminal device 7 is displayed. Also in this case, since the first virtual camera C1 operates in conjunction with the second virtual camera C2, the image displayed on the display device 2 changes in accordance with an operation performed onto the terminal device 7. Further, as shown in FIG. 23, a bird's-eye view image of the virtual space viewed from directly above may be displayed on the display device 2. Also in this case, the first virtual camera C1 similarly operates in conjunction with the second virtual camera C2. As shown in FIG. 22 and FIG. 23, an image in which the depth direction in the screen extends along the ground in the virtual space is displayed on the terminal device 7 as in the above embodiment, whereas an image in which the depth direction in the screen extends (substantially) perpendicularly to the ground in the virtual space is displayed on the display device 2. That is, an image of the virtual space including the user object 81 viewed from above in virtual space is displayed on the display device 2. In this case, the direction in the virtual space indicated by the up direction of the image displayed on the display device 2 corresponds to the depth direction for the image displayed on the terminal device 7. In other words, the imaging direction of the first virtual camera C1 and the imaging direction of the second virtual camera C2 may be set substantially perpendicularly (closer to perpendicular than parallel) to each other.

In the above embodiment, a position on the screen of the display device 2 is indicated by using the controller 5. However, in another embodiment, a position on the screen of the display device 2 may be indicated by using any device. For example, a pointer on the screen of the display device 2 may be moved by a direction input using: a pointing device such as a mouse; an analog stick; a cross key; a plurality of operation buttons; and the like, and the position of the pointer may be used as an indicated position. Alternatively, a touch panel may be provided on the screen of the display device 2, and a position on the screen of the display device 2 may be indicated by a touch operation.

In the above embodiment, a game corresponding to an object selected by a selection object is executed. In another embodiment, any other program may be executed corresponding to a selected object.

In the above embodiment, a position on the screen of the display device 2 is indicated and the indicated object 87 indicating the indicated position is displayed on the terminal device 7. In another embodiment, a position on the screen of the LCD 71 of the terminal device 7 is indicated, and an indicated object is located at a position in the virtual space corresponding to the indicated position, whereby the indicated object may be displayed on the display device 2.

For example, a touch panel is provided on the screen of the terminal device 7, a position on the LCD 71 is indicated through a touch operation, whereby an indicated object may be located at a position in the virtual space corresponding to the indicated position. Then, an image including the indicated object is displayed on the display device 2, whereby communication may be performed between the first user using the terminal device 7 and the second user viewing the display device 2. Further, a position on the screen of the LCD 71 of the terminal device 7 may be indicated by using an operation device other than the terminal device 7, and an indicated object may be located at a position in the virtual space corresponding to the indicated position. Then, an image including the indicated object may be displayed on the display device 2.

(Flow of Processes)

Next, processes performed in the game system 1 of the present embodiment will be described in detail. First, various types of data stored in the memory will be described. FIG. 24 shows a non-limiting example of various types of data stored in the game apparatus 3.

As shown in FIG. 24, a program 100 for performing later-described processes, a game program 101 for executing the game A, and a game program 102 for executing the game B are stored in the memory 11 and the like in the game apparatus 3. Attitude data 110 indicating the attitude of the terminal device 7, input direction data 111 indicating input directions of the left analog stick 72A and the right analog stick 72B, first virtual camera data 112 indicating the orientation of the first virtual camera C1, second virtual camera data 113 indicating the orientation of the second virtual camera C2, indicated position data 114 indicating the position on the screen of the display device 2 indicated by using the controller 5, object data 115 indicating the position of a user object, and the like are stored in the game apparatus 3. Moreover, data and the like indicating the positions of the house object 82 and the building object 89 are stored in the game apparatus 3.

(Description of Flowchart)

Figure 25:
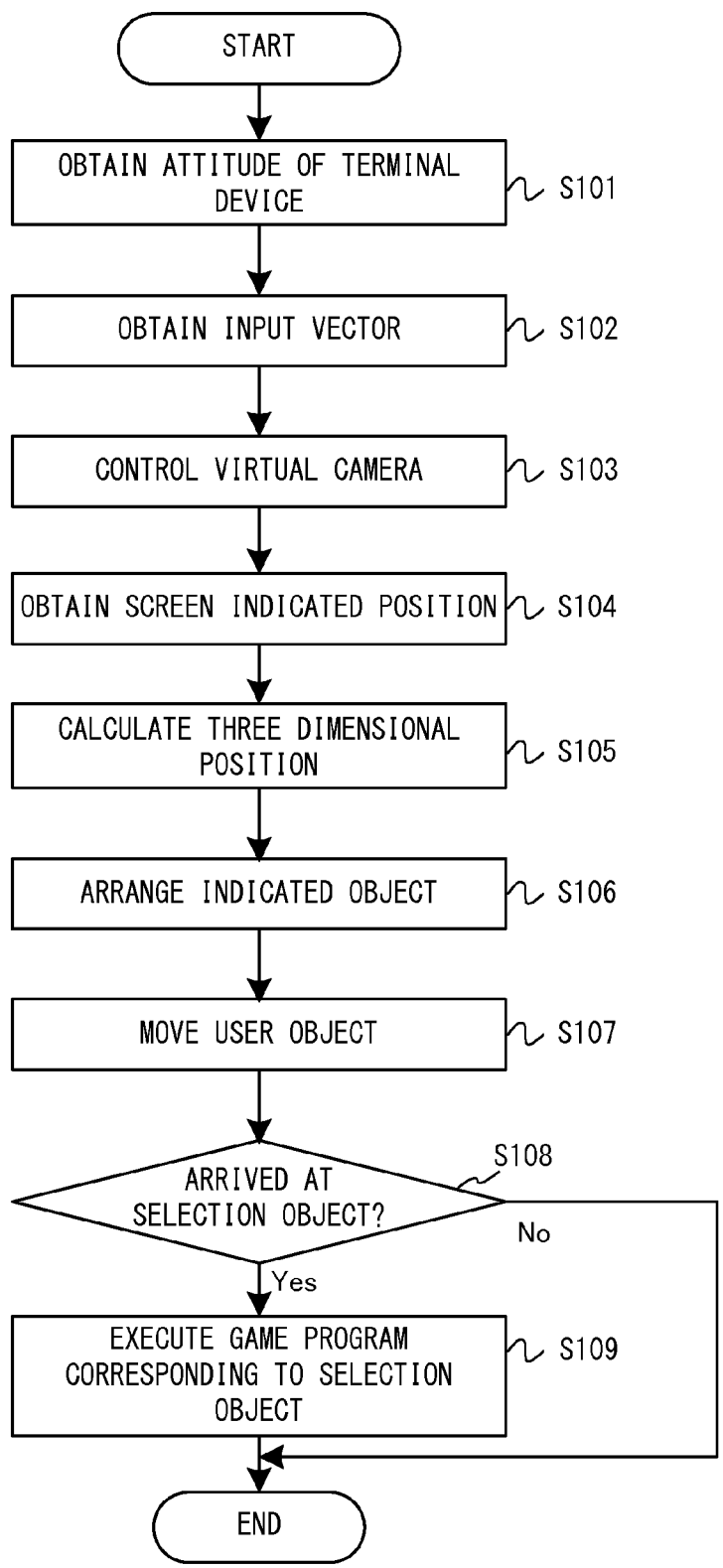
FIG. 25 is a non-limiting example of a main flowchart showing the flow of processes performed in the game apparatus 3.

Next, processes performed in the game apparatus 3 (CPU 10) will be described in detail with reference to FIG. 25. FIG. 25 is a non-limiting example of a main flowchart showing the flow of the processes performed in the game apparatus 3.

First, the game apparatus 3 obtains (calculates) the attitude of the terminal device 7 based on data which is from the inertial sensor 73 of the terminal device 7 and stored in the memory (step S101). Next, based on operation data which is from the terminal device 7 and stored in the memory, the game apparatus 3 obtains input vectors indicating input directions inputted by using the right analog stick 72B and the left analog stick 72A, respectively (step S102).

Next, the game apparatus 3 controls the first virtual camera C1 and the second virtual camera C2 based on the attitude of the terminal device 7 and the input vector of the right analog stick 72B (step S103). Specifically, the game apparatus 3 calculates an orientation of the first virtual camera C1 in accordance with the rotation of the terminal device 7 in the yaw direction, the pitch direction, and the roll direction. Moreover, the game apparatus 3 calculates a correction vector based on the input vector indicating the input direction by the right analog stick 72B and the rotation of the terminal device 7 in the roll direction, and rotates the first virtual camera C1 about y-axis in accordance with the calculated correction vector. Moreover, the game apparatus 3 sets an orientation of the second virtual camera C2 in accordance with the orientation of the first virtual camera C1 as described above.

Next, the game apparatus 3 obtains an indicated position on the screen of the display device 2 using the controller 5 (step S104), and calculates a three dimensional position, which is a position in the virtual space corresponding to the indicated position (step S105). Then, the game apparatus 3 locates the indicated object 87 at the calculated three dimensional position (step S106). Through the above processes, images viewed from the first virtual camera C1 and the second virtual camera C2 are generated respectively, and outputted to the terminal device 7 and the display device 2, respectively. Accordingly, an image of the virtual space including the indicated object 87 viewed from the first virtual camera C1 is displayed on the terminal device 7, and an image of the virtual space viewed from the second virtual camera C2 which operates in conjunction with the first virtual camera C1 is displayed on the display device 2.

Next, the game apparatus 3 moves the user object 81 in the virtual space, based on the input vector in accordance with the input direction by the left analog stick 72A (step S107). In this case, as described above, the input vector is corrected in accordance with the attitude of the terminal device 7 and then the user object 81 is moved based on the corrected vector. Then, it is determined whether the moved user object 81 has arrived at the position of the selection object arranged in the virtual space (step S108). When the user object 81 has arrived at the selection object (step S108: YES), the game apparatus 3 starts execution of a game program stored in the memory that corresponds to the selection object (step S109). When the user object 81 has not arrived at the selection object (step S108: NO), the game apparatus 3 ends the processes shown in FIG. 25.

It should be noted that the processes in the flowchart shown in FIG. 25 are repeatedly performed. The process of each step in the flowchart is merely an example and the order of processes of the steps may be changed as long as a similar result can be obtained.

Further, a part of the processes described above may be performed in the terminal device 7. For example, in accordance with the attitude of the terminal device 7 and a direction input using an analog stick, the orientation of the first virtual camera C1 may be calculated in the terminal device 7. In this case, the terminal device 7 calculates a vector obtained by rotating an input vector of the analog stick in accordance with the attitude of the terminal device 7, and calculates the orientation of the first virtual camera C1 based on the calculated vector.

Further, the above programs may not be executed in the game apparatus 3, but may be executed in any other information processing apparatus, and the information processing apparatus may function as the game system described above. For example, as another information processing apparatus, a mobile phone, a smart phone, a PDA, a personal computer, a tablet-type computer, or the like may be used. Such information processing apparatuses may function as the game apparatus 3 and the terminal device 7.

Further in another embodiment, in a game system including a plurality of apparatuses capable of communicating with each other, the plurality of apparatuses may share the execution of the above-described game processing performed in the game apparatus 3. For example, a plurality of information processing apparatuses connected to a network such as the Internet may form the game system as described above.

Further, in the above embodiment, the processes in the above flowchart are performed, by the CPU of the game apparatus 3 executing programs. In another embodiment, a part or the whole of the above processes may be performed by a dedicated circuit included in the game apparatus 3 or by a different general-purpose processor. At least one processor may function as a "programmed logic circuit" for performing the above-described processes.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A display control system configured to cause a first display device and a second display device other than the first display device to display images, the display control system comprising:
    a virtual camera control section configured to control a first virtual camera based on an operation performed via a first operation device;
    a first display control section configured to cause the first display device to display an image of a virtual space viewed from the first virtual camera;
    a second display control section configured to cause the second display device to display an image of the virtual space viewed from the first virtual camera or a second virtual camera which operates in conjunction with the first virtual camera;
    an indicated position obtaining section configured to obtain a position on a screen of the second display device indicated by using a second operation device other than the first operation device;
    a position calculation section configured to calculate a position in the virtual space corresponding to the position on the screen of the second display device obtained by the indicated position obtaining section; and
    an object arrangement section configured to arrange a predetermined virtual object at the position in the virtual space calculated by the position calculation section, wherein
    the first display control section causes the first display device to display an image including the predetermined object.

2. The display control system according to claim 1, wherein
    the first display device and the first operation device are realized in one portable device.

3. The display control system according to claim 1, wherein
    the first virtual camera takes an image including a user object arranged in the virtual space, and
    the display control system further comprises:
        a user object control section configured to move the user object in accordance with the operation performed onto the first operation device; and
        a processing section configured to perform, when the user object has selected a selection object arranged in the virtual space, a predetermined process corresponding to the selection object.

4. The display control system according to claim 3, wherein
    the first display control section further causes the first display device to display an indicator indicating a positional relationship between the predetermined object and the user object.

5. The display control system according to claim 3, wherein
    the processing section executes a predetermined program corresponding to the selection object.

6. The display control system according to claim 1, wherein
    the second display control section causes the second display device to display an image of the virtual space viewed from the second virtual camera,
    the first virtual camera rotates with respect to a plurality of directions, in accordance with the operation performed onto the first operation device, and
    the second virtual camera operates in conjunction with the first virtual camera with respect to a predetermined direction among the plurality of directions.

7. The display control system according to claim 6, wherein
    the predetermined direction is a yaw direction based on the virtual space.

8. The display control system according to claim 1, wherein
    the second display control section causes the second display device to display an image of the virtual space viewed from the second virtual camera, and
    a range of a virtual space image of which is taken by the second virtual camera is wider than a range of a virtual space image of which is taken by the first virtual camera.

9. The display control system according to claim 1, wherein
    an orientation of the second virtual camera is set such that a direction in the virtual space corresponding to a depth direction for the image displayed on the first display device coincides with a depth direction for the image displayed on the second display device.

10. The display control system according to claim 1, wherein
    an orientation of the second virtual camera is set such that a direction in the virtual space corresponding to a depth direction for the image displayed on the first display device coincides with an up direction for the image displayed on the second display device.

11. A computer implemented display control method using an information processing apparatus having one or more processors for causing a first display device and a second display device other than the first display device to display images, the display control method comprising:
    controlling a first virtual camera based on an operation performed via a first operation device;
    causing the first display device to display an image of a virtual space viewed from the first virtual camera;
    causing the second display device to display an image of the virtual space viewed from the first virtual camera or a second virtual camera which operates in conjunction with the first virtual camera;
    obtaining a position on a screen of the second display device indicated by using a second operation device other than the first operation device;
    calculating, using said one or more computer processor, a position in the virtual space corresponding to the position on the screen of the second display device indicated by using the second operation device; and
    arranging a predetermined object at the position calculated in the virtual space and displaying an image of the virtual space including the predetermined object on the first display device.

12. The display control method according to claim 11, wherein
the first display device and the first operation device are realized in one portable device.

13. The display control method according to claim 11, wherein
the first virtual camera takes an image including a user object arranged in the virtual space, and
the display control method further comprises:
moving the user object in accordance with the operation performed onto the first operation device; and
executing, when the user object has selected a selection object arranged in the virtual space, a predetermined process corresponding to the selection object.

14. The display control method according to claim 13, wherein
the first display device is further caused to display an indicator indicating a positional relationship between the predetermined object and the user object.

15. The display control method according to claim 13, wherein
a predetermined program corresponding to the selection object is executed.

16. The display control method according to claim 11, wherein
the second display device is caused to display an image of the virtual space viewed from the second virtual camera,
the first virtual camera rotates with respect to a plurality of directions, in accordance with the operation performed onto the first operation device, and
the second virtual camera operates in conjunction with the first virtual camera with respect to a predetermined direction among the plurality of directions.

17. The display control method according to claim 16, wherein
the predetermined direction is a yaw direction based on the virtual space.

18. The display control method according to claim 11, wherein
the second display device is caused to display an image of the virtual space viewed from the second virtual camera, and
a range of the virtual space an image of which is taken by the second virtual camera is wider than a range of the virtual space an image of which is taken by the first virtual camera.

19. The display control method according to claim 11, wherein
an orientation of the second virtual camera is set such that a direction in the virtual space corresponding to a depth direction for the image displayed on the first display device coincides with a depth direction for the image displayed on the second display device.

20. The display control method according to claim 11, wherein
an orientation of the second virtual camera is set such that a direction in the virtual space corresponding to a depth direction for the image displayed on the first display device coincides with an up direction for the image displayed on the second display device.

21. A non-transitory computer-readable storage medium having stored thereon a display control program including computer executable instructions for causing a first display device and a second display device other than the first display device to display images, the program instructions causing the computer to perform operations comprising:
controlling a first virtual camera based on an operation performed via a first operation device;
causing the first display device to display an image of a virtual space viewed from first virtual camera;
causing the second display device to display an image of the virtual space viewed from the first virtual camera or a second virtual camera which operates in conjunction with the first virtual camera;
obtaining a position on a screen of the second display device indicated by using a second operation device other than the first operation device;
calculating a position in the virtual space corresponding to the obtained position on the screen of the second display device, and
arranging a predetermined object to be displayed at the calculated position in the virtual space on the first display device.

22. A display control apparatus configured to cause a first display device and a second display device other than the first display device to display images, the display control apparatus comprising:
a computer system including at least one computer processor, the computer system being configured to perform:
a virtual camera control configured to control a first virtual camera based on an operation performed via a first operation device;
a first display control configured to cause the first display device to display an image of a virtual space viewed from the first virtual camera;
a second display control configured to cause the second display device to display an image of the virtual space viewed from the first virtual camera or a second virtual camera which operates in conjunction with the first virtual camera;
an indicated position obtainment configured to obtain a position on a screen of the second display device indicated by using a second operation device other than the first operation device;
a position calculation configured to calculate a position in the virtual space corresponding to the position on the screen of the second display device obtained by the indicated position obtaining section; and
an object arrangement configured to arrange a predetermined virtual object at the position in the virtual space calculated by the position calculation section, wherein
the first display control causes the first display device to display an image including the predetermined object.

* * * * *